United States Patent
Kim et al.

(10) Patent No.: US 10,180,752 B2
(45) Date of Patent: Jan. 15, 2019

(54) DISPLAY DEVICE AND GATE DRIVING CIRCUIT THEREOF

(71) Applicant: LG Display Co., Ltd., Seoul (KR)

(72) Inventors: Jiah Kim, Goyang-si (KR); Byeongseong So, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/605,621

(22) Filed: May 25, 2017

(65) Prior Publication Data

US 2017/0344179 A1 Nov. 30, 2017

(30) Foreign Application Priority Data

May 30, 2016 (KR) .......................... 10-2016-0066434

(51) Int. Cl.
*G06F 3/041* (2006.01)
*G06F 3/044* (2006.01)
*G09G 3/36* (2006.01)
*G02F 1/1333* (2006.01)

(52) U.S. Cl.
CPC ............ *G06F 3/0416* (2013.01); *G06F 3/044* (2013.01); *G09G 3/3677* (2013.01); *G09G 3/3688* (2013.01); *G02F 1/13338* (2013.01); *G09G 2310/0251* (2013.01); *G09G 2310/0286* (2013.01); *G09G 2310/08* (2013.01); *G09G 2354/00* (2013.01)

(58) Field of Classification Search
CPC ............ G09G 2310/08; G09G 3/3677; G09G 2310/0286; G09G 3/3266; G09G 2310/0267; G06F 3/0416; G06F 3/0412; G06F 3/044
See application file for complete search history.

(56) References Cited

U.S. PATENT DOCUMENTS

| 7,382,348 | B2* | 6/2008 | Kim ..................... G09G 3/3677 345/100 |
| 2008/0191980 | A1 | 8/2008 | Jeon |
| 2010/0302230 | A1* | 12/2010 | Moon .................. G09G 3/3677 345/212 |
| 2012/0139883 | A1 | 6/2012 | Lee et al. |
| 2015/0213746 | A1 | 7/2015 | Kim et al. |
| 2017/0123539 | A1 | 5/2017 | Wang et al. |

FOREIGN PATENT DOCUMENTS

CN 105206218 A 12/2015

OTHER PUBLICATIONS

European Partial Search Report, European Application No. 17173433.8, dated Jul. 10, 2017, 18 pages.
European Extended Search Report, European Application No. 17173433.8, dated Oct. 12, 2017, 21 pages.

* cited by examiner

*Primary Examiner* — Koosha Sharifi-Tafreshi
(74) *Attorney, Agent, or Firm* — Fenwick & West LLP

(57) ABSTRACT

A display device and a gate driver circuit of the display device are disclosed. The display device includes a shift register that shifts a gate pulse in accordance with a shift clock and sequentially supplies the gate pulse to gate lines. At least one stage of the shift register includes a discharge blocking node connected to a source terminal of the second transistor, and a discharge blocking circuit configured to charge the discharge blocking node when the Q node is charged, and discharge the discharge blocking node when the Q node is discharged.

20 Claims, 21 Drawing Sheets

FIG. 17

| Stage | Circuit | Block | |
|---|---|---|---|
| S1 | A | | ↑ |
| S2 | A | | |
| ... | ... | B1 | Td1 |
| S30 | A | | |
| S31 | A | | ↓ |
| | | | ↕ Tt1 |
| S32 | B | | ↑ |
| S33 | A | | |
| ... | ... | B2 | Td2 |
| S61 | A | | |
| S62 | A | | ↓ |
| | | | ↕ Tt2 |
| S63 | B | A | ⋮ |
| ... | ... | ... | |
| S1055 | B | | ↑ |
| S1056 | A | | |
| ... | ... | B35 | Td35 |
| S1084 | A | | |
| S1085 | A | | ↓ |

| Stage | Circuit |
|-------|---------|
| S1    | B       |
| S2    | B       |
| ...   | B       |
| S1084 | B       |
| S1085 | B       |

DISPLAY DEVICE AND GATE DRIVING CIRCUIT THEREOF

CROSS REFERENCE TO RELATED APPLICATIONS

This application claims the benefit of Korean Patent Application No. 10-2016-0066434 filed on May 30, 2016, the entire contents of which is incorporated herein by reference for all purposes as if fully set forth herein.

BACKGROUND

Field of the Invention

The present disclosure relates to a display device, in which touch sensors and pixels are embedded in a display panel, and a gate driver circuit of the display device.

Discussion of the Related Art

User interfaces (UIs) are configured to allow users to communicate with various electronic devices and to easily and comfortably control the electronic devices as they desire. Examples of UIs include a keypad, a keyboard, a mouse, an on-screen display (OSD), and a remote controller having an infrared communication function or a radio frequency (RF) communication function. User interface technology has continuously expanded to increase user's sensibility and handling convenience. UIs have been recently developed to include touch UIs, voice recognition UIs, 3D UIs, and the like.

A touch UI senses a touch input using a touch screen implemented on a display panel and transmits the touch input to an electronic device. The touch UI has been adopted in portable information devices, such as smart phones, and use of the touch UI has been expanded to include uses in notebook computers, computer monitors, and home appliances.

A technology for implementing a touch screen has been recently applied to various display devices using a technology (hereinafter referred to as "in-cell touch sensor technology") for embedding touch sensors in a pixel array of a display panel. The touch sensors may be implemented as capacitive touch sensors sensing a touch input based on changes in a capacitance before and after the touch input.

In in-cell touch sensor technology, touch sensors may be installed in a display panel without an increase in a thickness of the display panel. Electrodes of pixels of the display panel may be used as touch electrodes of the touch sensors. As shown in FIG. 1, in the in-cell touch sensor technology, a common electrode for supplying a common voltage Vcom to pixels of a liquid crystal display may be divided to form touch electrodes C1 to C4. The touch electrodes C1 to C4 are connected to sensor lines SL. Because touch sensors Cs are embedded in a pixel array of a display panel, the touch sensors Cs are coupled with pixels through parasitic capacitances. In order to reduce signal interference (e.g., crosstalk) attributable to coupling between the pixels and the touch sensors Cs in the in-cell touch sensor technology, one frame period is time-divided into a display period and a touch sensing period. The in-cell touch sensor technology supplies a reference voltage (i.e., the common voltage Vcom) of the pixel to the touch electrodes C1 to C4 during the display period and drives the touch sensors Cs and senses a touch input during the touch sensing period.

A display device includes a data driver supplying a data voltage to data lines of a display panel, a gate driver (also referred to as a gate driver circuit or a scan driver) supplying a gate pulse (also referred to as a scan pulse) to gate lines of the display panel, and a touch sensing unit (also referred to as a touch sensing circuit or a touch driver circuit) driving touch sensors.

The gate driver sequentially shifts the gate pulse applied to the gate lines using a shift register. The gate pulse is synchronized with the data voltage (i.e., a pixel voltage) of an input image and sequentially selects each pixel to be charged to the data voltage. The shift register includes cascade-connected stages. The stages of the shift register receive a start signal or a carry signal received from a previous stage as the start signal and generate an output when a clock is input.

A screen of the display device may be divided into two or more blocks, and a touch sensing period may be allocated between a driving time of one block and a driving time of another block. For example, during a first display period, pixels of a first block may be driven, and data of the first block may be updated to current frame data. During a touch sensing period following the first display period, a touch input may be sensed. During a second display period following the touch sensing period, pixels of a second block may be driven, and data of the second block may be updated to current frame data. However, such a method may deteriorate the output characteristic of the gate pulse supplied to the gate lines, and as a result, lead to a reduction in image quality of the display device.

For example, in the second block driven immediately after the touch sensing period, a voltage of a Q node at a stage of a shift register outputting a first gate pulse may be discharged during the touch sensing period due to a leakage current. Because the Q node is connected to a gate of a pull-up transistor, a decrease in the voltage of the Q node may make a bootstrapping operation of turning on the pull-up transistor incomplete. Hence, the gate pulse, does not rise to a normal voltage level. As a result, a luminance of pixels arranged on a first line in the second block may be reduced due to a decrease in a voltage of a first gate pulse generated when the pixels of the second block starts to be driven, and a reduction in the image quality, such as a line dim, may appear. In the shift register, in which an output of a previous stage as a carry signal is input to a start signal input terminal of a next stage, a reduction in the output characteristic of a stage generating a first gate pulse after the touch sensing period leads to a decrease in voltages of all of gate pulses generated after the first gate pulse. Further, there is no gate pulse generated after the first gate pulse.

SUMMARY OF THE INVENTION

The present disclosure provides a display device employing in-cell touch sensor technology and including a touch screen capable of preventing a reduction in image quality due to a touch sensing period, and a gate driver circuit of the display device.

In one aspect, there is provided a display device including a display panel including pixels, that are connected to data lines and gate lines, the pixels are divided in a plurality of blocks that are time division driven in a plurality of display periods within one frame period, and a plurality of touch sensors connected to the pixels, the plurality of touch sensors driven between display periods of adjacent blocks; a display driving circuit configured to write data of an input image to the pixels in a plurality of display periods divided from one frame period; and a touch sensing unit configured to drive the plurality of touch sensors and sense a touch input during a touch sensing period. The display driving circuit includes a shift register that shifts a gate pulse in accordance with a shift clock and sequentially supplies the gate pulse to the gate lines. Each of stages included in the shift register includes a Q node controlling a pull-up transistor increasing a voltage of the gate pulse, a first transistor charging the Q node in response to a start signal or an output signal of a previous stage, and a second transistor switching on and off a discharge path of the Q node in response to an output signal of a next stage. At least some of the stages includes a discharge blocking node connected to a source terminal of the second transistor, and a discharge blocking circuit coupled to the discharge blocking node, and configured to charge the discharge blocking node when the Q node is charged, and discharge the discharge blocking node when the Q node is discharged.

In another aspect, there is provided a gate driver circuit of a display device including a display panel including pixels, that are connected to data lines and gate lines and are division-driven based on a plurality of blocks, and a plurality of touch sensors connected to the pixels, the gate driver circuit including a shift register configured to shift a gate pulse in accordance with a shift clock and sequentially supply the gate pulse to the gate lines, the shift register having a plurality of stages. Each of stages of the shift register includes a Q node controlling a pull-up transistor increasing a voltage of the gate pulse, a first transistor charging the Q node in response to a start signal or an output signal of a previous stage, and a second transistor switching on and off a discharge path of the Q node in response to an output signal of a next stage. At least some of the stages includes a discharge blocking node connected to the source terminal of the second transistor, and a discharge blocking circuit coupled to the discharge blocking node, and configured to charge the discharge blocking node when the Q node is charged, and discharge the discharge blocking node when the Q node is discharged.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 17 illustrates an example where a discharge blocking circuit is applied to some of stages constituting a shift register;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. Detailed descriptions of known arts will be omitted if such may mislead the embodiments of the invention.

A display device according to embodiments herein may be implemented as a flat panel display, such as a liquid crystal display (LCD) or an organic light emitting diode (OLED) display. In the following description, embodiments will be described using a liquid crystal display as an example of a flat panel display. However, embodiments are not limited thereto, and other types of flat panel displays may be used. For example, a display device according to embodiments herein may be implemented as any display device to which in-cell touch sensor technology is applicable.

Switching elements of a gate driver circuit according to embodiments may be implemented as transistors of n-type or p-type metal oxide semiconductor field effect transistor (MOSFET) structure. In embodiments disclosed herein, n-type transistors are described by way of example. However, embodiments are not limited thereto, and other types of transistors may be used. The transistor is a three-electrode element including a gate, a source, and a drain. The source is an electrode for supplying carriers to the transistor. The carriers inside the transistor begin to flow from the source. The drain is an electrode from which the carriers exit the transistor. Namely, carriers in the MOSFET flow from the source to the drain. In case of an n-type MOSFET (NMOS), because carriers are electrons, a source voltage is less than a drain voltage so that electrons can flow from a source to a drain. In the n-type MOSFET, because electrons flow from the source to the drain, a current flows from the drain to the source. In case of a p-type MOSFET (PMOS), because carriers are holes, a source voltage is greater than a drain voltage so that holes can flow from a source to a drain. In the p-type MOSFET, because holes flow from the source to the drain, a current flows from the source to the drain. In embodiments disclosed herein, the source and the drain of the MOSFET are not fixed. For example, the source and the drain of the MOSFET may be changed depending on an applied voltage. The following embodiments are limited to the source and the drain of the transistor.

A touch sensor according to embodiments may be implemented as a capacitive touch sensor, which is able to be embedded in a pixel array, for example, a mutual capacitance touch sensor or a self-capacitance touch sensor. In the following description, embodiments will be described using a self-capacitance touch sensor as an example. However, embodiments are not limited thereto, and other types of touch sensors may be used.

Figure 1:
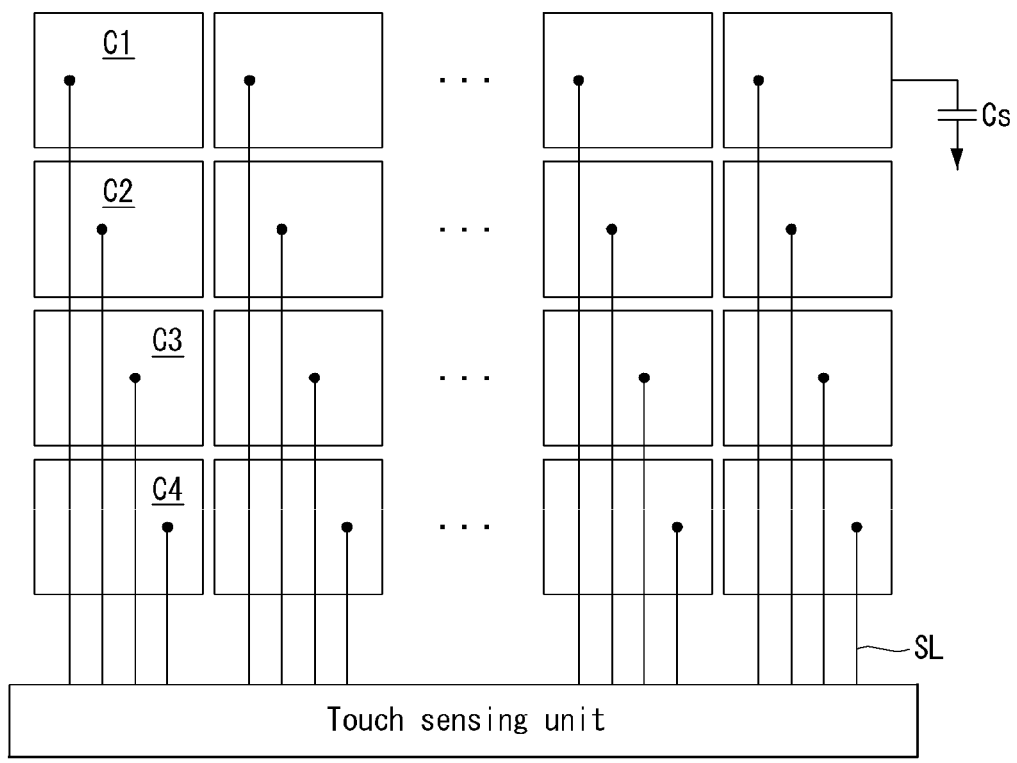
FIG. 1 is a plan view illustrating a touch electrode pattern of touch sensors and a touch sensing unit according to a related art.
Figure 2:
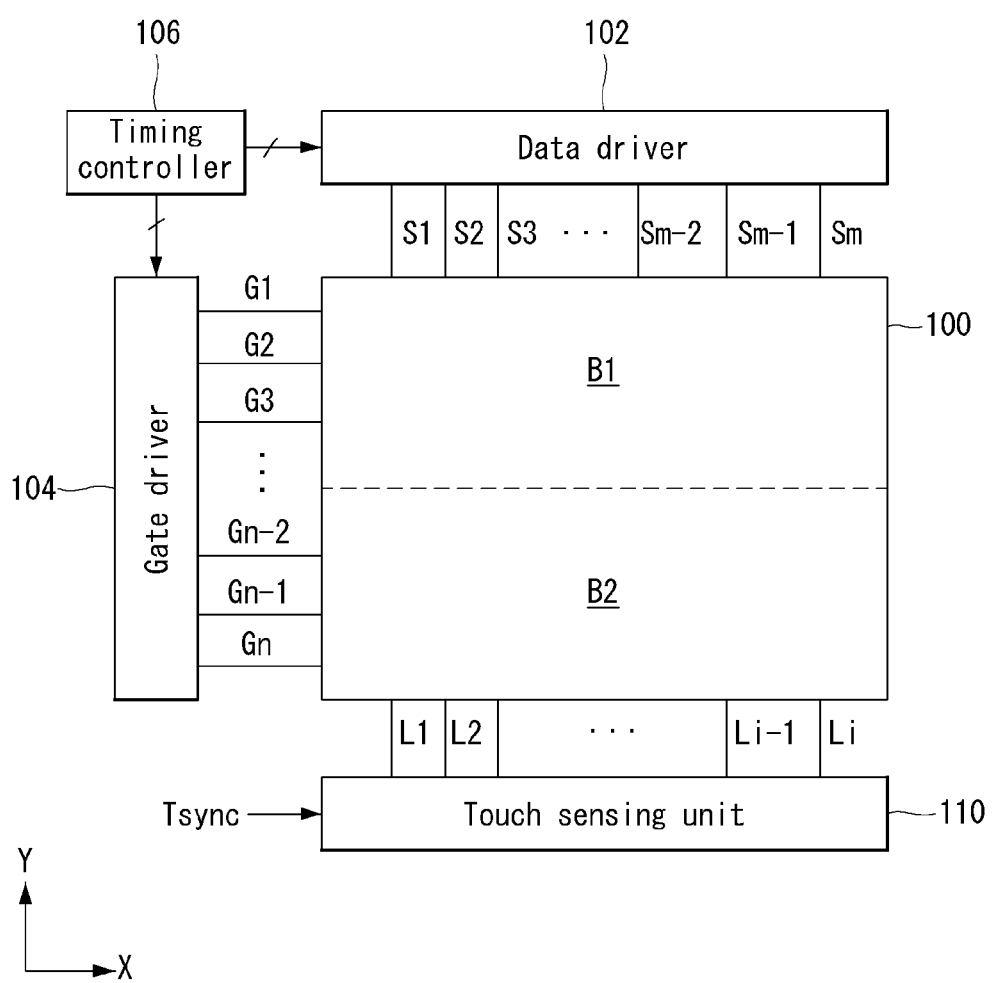
FIGS. 2 and 3 are block diagrams illustrating a display device according to an embodiment.
Figure 3:
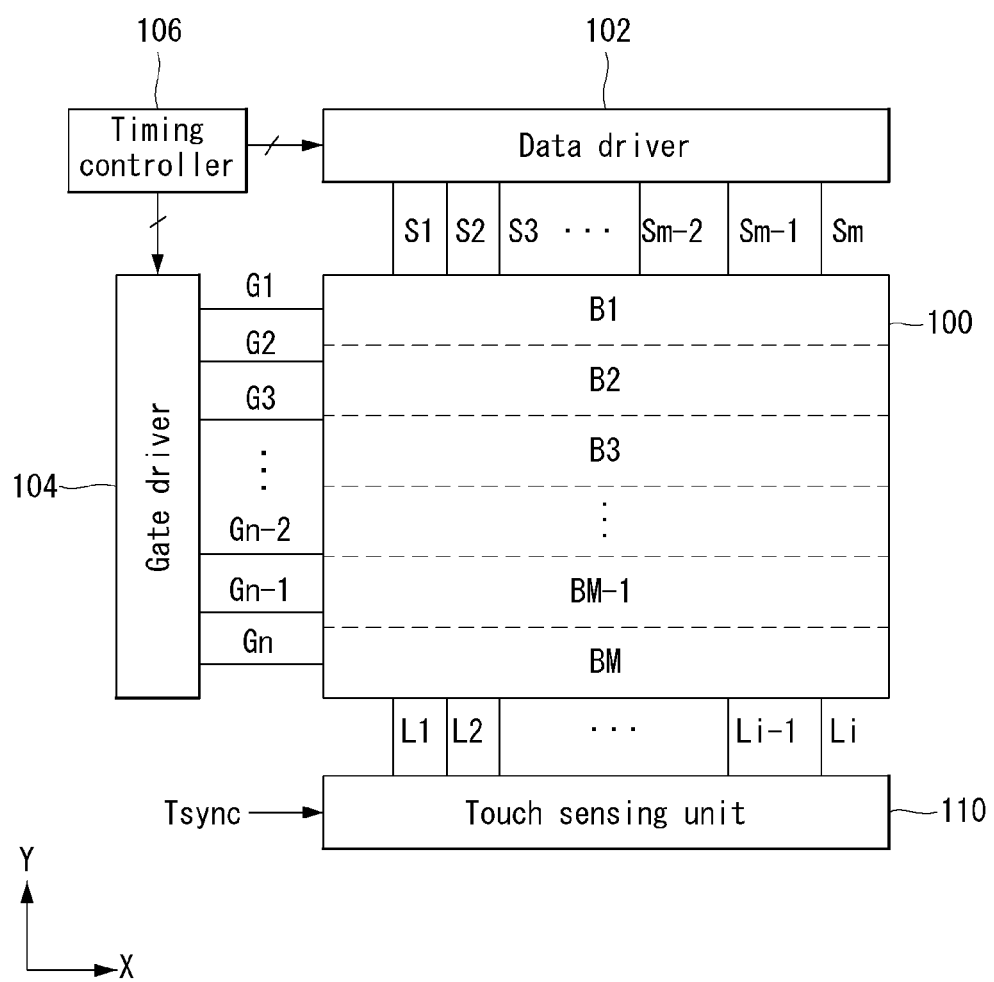
Figure 4:
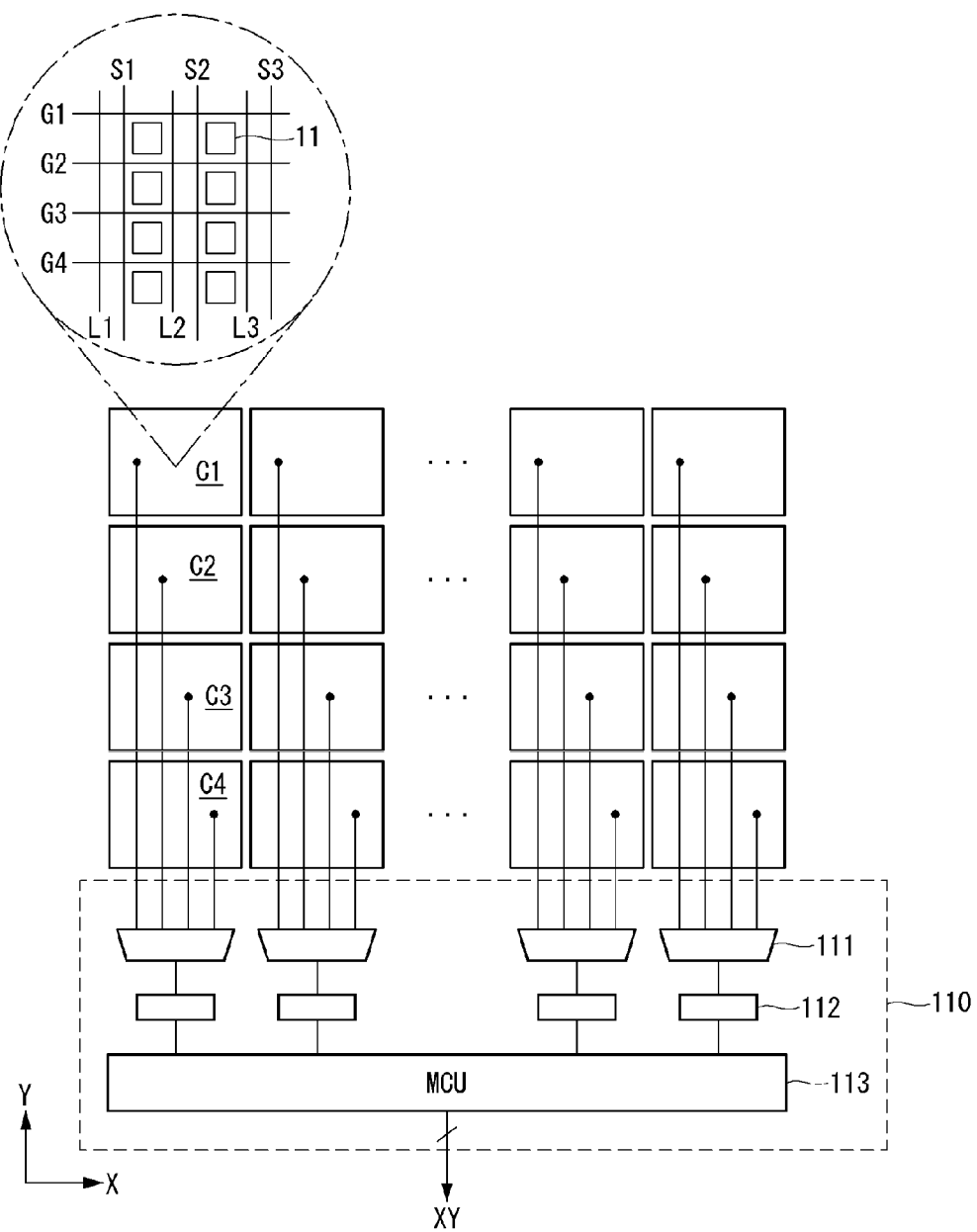
FIG. 4 illustrates a plan layout of in-cell touch sensors and a circuit configuration of a touch sensing unit.

Referring to FIGS. 2 to 4, a display device according to an embodiment includes a display panel 100, a display driving circuit, and a touch sensing unit 110.

One frame period of the display panel 100 may be time-divided into one or more display periods and one or more touch sensing periods, in order to drive in-cell touch sensors and pixels 11 (see FIG. 4) embedded together in a pixel array. A screen (i.e., the pixel array) of the display panel 100 is time-division driven in two or more blocks. Adjacent blocks of the display panel 100 are time division-driven in display periods that are separated from each other with a touch sensing period, in which touch sensors are driven, interposed therebetween.

The blocks do not need to be physically separated. FIG. 2 illustrates an example where the screen of the display panel 100 is divided into two blocks B1 and B2. FIG. 3 illustrates an example where the screen of the display panel 100 is divided into M blocks B1 to BM, where M is a positive integer equal to or greater than 3. The blocks of the display panel 100 are time-division driven with a touch sensing period interposed therebetween. For example, during a first display period, pixels 11 of a first block B1 are driven, and current frame data is written to the pixels 11. During a first touch sensing period following the first display period, a touch input of the entire screen is sensed. During a second display period following the first touch sensing period, pixels 11 of a second block B2 are driven, and current frame data is written to the pixels 11.

The screen of the display panel 100 includes the pixel array, on which an input image is reproduced. The pixel array includes m×n pixels formed in pixel areas defined by m data lines S1 to Sm and n gate lines G1 to Gn, where m and n are a positive integer. Each pixel 11 includes thin film transistors (TFTs) formed at crossings of the data lines S1 to Sm and the gate lines G1 to Gn, a pixel electrode charged to a data voltage, a storage capacitor Cst that is connected to the pixel electrode and holds the data voltage, and the like. The pixels 11 of the pixel array display the input image. A structure of the pixels 11 may be changed depending on driving characteristics of the display device.

The pixel array of the display panel 100 further includes touch electrodes C1 to C4 and sensor lines L1 to Li connected to the touch electrodes C1 to C4, where 'i' is a positive integer less than m and n. The touch electrodes C1 to C4 may be implemented using a method for dividing a common electrode connected to the plurality of pixels 11. One touch electrode is commonly connected to the plurality of pixels 11 and forms one touch sensor. Thus, the touch sensors supply a common voltage Vcom of the same level to the pixels 11 through the touch electrode during the display period. In each touch sensing period, the touch sensors are driven by the touch sensing unit 110 and sense a touch input of the entire screen.

The touch sensors embedded in the pixel array may be implemented as capacitive touch sensors. Each capacitive touch sensor may have a capacitance. The capacitance may be divided into a self-capacitance or a mutual capacitance. The self-capacitance may be formed along a conductor line of a single layer formed in one direction, and the mutual capacitance may be formed between two conductor lines perpendicular to each other. FIG. 4 shows a self-capacitance touch sensor by way of example. However, embodiments are not limited thereto.

Black matrixes, color filters, etc. may be formed on an upper substrate of the display panel 100.

The display driving circuit includes a data driver 102, a gate driver 104, and a timing controller 106 and writes data of an input image to the pixels 11 of the display panel 100 during the display period. During the display period, the data driver 102 converts digital video data of the input image received from the timing controller 106 into a gamma compensation voltage and outputs a data voltage through output channels. The data driver 102 then supplies the data voltage to the data lines S1 to Sm during the display period.

During the touch sensing period, the output channels of the data driver 102 are separated from the data lines S1 to Sm and may maintain a high impedance state. The data voltage stored in capacitors of the pixels 11 is not discharged and held because the TFTs are not turned on during the touch sensing period.

A multiplexer (not shown) may be disposed between the data driver 102 and the data lines S1 to Sm. The multiplexer may be formed on a substrate of the display panel 100 or may be integrated into a driver integrated circuit (IC) together with the data driver 102. The multiplexer may distribute the data voltage received from the data driver 102 to the data lines S1 to Sm under the control of the timing controller 106. For example, a 1-to-2 multiplexer may time-divide the data voltage input through one output channel of the data driver 102 and supply the time-divided data voltages to two data lines S1 and S2. Thus, the use of the 1-to-2 multiplexer can reduce the number of output channels of a driver IC by half.

The gate driver 104 sequentially supplies a gate pulse (also referred to as a scan pulse) to the gate lines G1 to Gn using a shift register. The shift register shifts the gate pulse in accordance with timing of a shift clock and sequentially supplies the gate pulse to the gate lines G1 to Gn.

The shift register includes cascade-connected stages. Each stage sequentially outputs the gate pulse to the gate lines G1 to Gn of the display panel 100 in response to a voltage of a Q node. The Q node is charged in response to a start signal or a carry signal from a previous stage and pre-charges a gate of a pull-up transistor. When the Q node receives a shift clock in a state of being pre-charged, a potential of the Q node rises to a voltage greater than a threshold voltage of the pull-up transistor due to bootstrapping. Hence, the stage increases a voltage of an output terminal to a gate high voltage VGH and starts to output the gate pulse. The gate pulse is supplied to the gate lines G1 to Gn and simultaneously turns on the TFTs of the line supplied with the data voltage. During the touch sensing period, the shift clock is not input to the gate driver 104 so that the gate driver 104 does not output the gate pulse. As a result, there is no gate pulse output from the gate driver 104 during the touch sensing period.

At least some of the stages of the shift register include a discharge blocking circuit suppressing a discharge of the Q node during the touch sensing period. Because the voltage of the Q node is not discharged by the discharge blocking circuit during the touch sensing period, a gate pulse first generated after the touch sensing period is generated at a voltage required in a normal operation of the pixels 11. The embodiments add the discharge blocking circuit to the stages of the shift register to prevent problems generated when one frame period is time-divided into the display period and the touch sensing period. For example, the embodiments can prevent the line from being displayed on the screen after the touch sensing period and prevent the data voltage from being abnormally applied to the pixels 11 after the touch sensing period. As a result, the embodiments can improve the image quality of the display device including the in-cell touch sensors.

The shift register and the pixels 11 are may be mounted together on the substrate of the display panel 100. Hereinafter, the shift register mounted on the substrate of the display panel 100 is referred to as a "gate-in panel (GIP) circuit".

The timing controller 106 transmits the digital video data of the input image received from a host system (not shown) to the data driver 102. The timing controller 106 receives timing signals, such as a vertical sync signal Vsync, a horizontal sync signal Hsync, a data enable signal DE, and a main clock MCLK, in synchronization with data of the input image. The timing controller 106 generates a data timing control signal for controlling operation timing of the data driver 102 and a gate timing control signal for controlling operation timing of the gate driver 104 based on the timing signals.

The gate timing control signal includes a start signal VST, a gate shift clock CLK, a gate output enable signal GOE, and the like. The gate output enable signal GOE may be omitted in the GIP circuit. The GIP circuit is a shift register circuit of the gate driver 104 disposed on the substrate of the display panel 100, on which the pixel array is disposed. The start signal VST is input to a start signal input terminal of a first stage of the shift register of the gate driver 104 and controls an output timing of a first gate pulse that is first generated in one frame period. The start signal VST according to the embodiments is generated once at a start timing of a frame period in each frame period as in a general operation of the gate driver. The gate shift clocks CLK are sequentially generated to control an output timing of the gate pulse in each stage and to control a shift timing of the gate pulse in each stage. The gate shift clock CLK is not generated in the touch sensing period. When the gate shift clock CLK is generated in the touch sensing period, the data voltage applied to the pixels 11 may be discharged or an undesired noise may be supplied to the pixels 11. Hence, a noise may appear on the screen. The gate output enable signal GOE controls an output timing of the gate driver 104.

When the gate driver 104 is implemented as the GIP circuit, the gate timing control signal generated by the timing controller 106 is converted into a voltage swinging between a gate high voltage VGH and a gate low voltage VGL by a level shifter (not shown) and is input to the GIP circuit. Thus, the start signal MST and the gate shift clock CLK input to the GIP circuit swing between the gate high voltage VGH and the gate low voltage VGL. The gate high voltage VGH is greater than a threshold voltage of transistors constituting the GIP circuit and the pixel, and the gate low voltage VGL is less than the threshold voltage of the transistors.

The host system may be one of a television system, a set-top box, a navigation system, a DVD player, a Blu-ray player, a personal computer (PC), a home theater system, a phone system, and other systems that include or operate in conjunction with a display. The host system includes a system-on chip (SoC), in which a scaler is embedded, and converts digital video data of an input image into a format suitable for displaying the input image on the display panel 100. The host system transmits the digital video data of the input image and the timing signals Vsync, Hsync, DE, and MCLK to the timing controller 106. The host system executes an application associated with coordinate information (e.g., an X-Y coordinate point) of a touch input received from the touch sensing unit 110.

The touch sensing unit 110 drives the touch sensors in response to a sync signal Tsync received from the timing controller 106 or the host system during the touch sensing period. The touch sensing unit 110 supplies a touch driving signal to the sensor lines L1 to Li and senses a touch input during the touch sensing period. The touch sensing unit 110 compares a change in an amount of charge detected by the touch sensor, which varies depending on the presence or absence of a touch input, with a predetermined threshold value. When the change in the amount of charge is equal to or greater than the predetermined threshold value, the touch sensing unit 110 determines the touch sensor as a touch input and calculates coordinates of a position of the touch input. The touch sensing unit 110 transmits coordinate information of the touch input position to the host system.

FIG. 4 illustrates a plan layout of in-cell touch sensors and a circuit configuration of the touch sensing unit. Each of the touch electrodes C1 to C4 may be formed as a division pattern of a common electrode of a plurality of pixels 11. The touch sensing unit 110 includes a plurality of multiplexers 111, a plurality of sensing circuits 112, and a microcontroller unit (MCU) 113.

The multiplexer 111 selects sensor lines L1 to L3 to be connected to the sensing circuits 112 under the control of the MCU 113 during the touch sensing period. Each multiplexer 111 sequentially connects N sensor lines L1 to L3 to a channel of the sensing circuit 112, thereby reducing the number of channels of the sensing circuit 112. The multiplexer 111 may supply the common voltage Vcom to the sensor lines L1 to L3 under the control of the MCU 113 during the display period.

The sensing circuit 112 amplifies and integrates an amount of charge of a sensor line signal received via the multiplexer 111 and converts it into digital data. The sensing circuit 112 includes an amplifier amplifying a received touch sensor signal, an integrator accumulating an output voltage of the amplifier, and an analog-to-digital converter (ADC) converting a voltage of the integrator into digital data. The sensing circuit 112 transmits digital data, as touch raw dart, output from the ADC to the MCU 113.

The MCU 113 controls the multiplexers 111 and connects the sensor lines L1 to L3 to the sensing circuits 112. The MCU 113 compares touch raw data received from the sensing circuit 112 with a predetermined threshold value and determines a touch input. The MCU 113 performs a predetermined touch sensing algorithm and calculates coordinates of a position of each touch input. The MCU 113 produces touch coordinate data (e.g., in the X and Y axis) and transmits the touch coordinate data XY to the host system.

Figure 5:
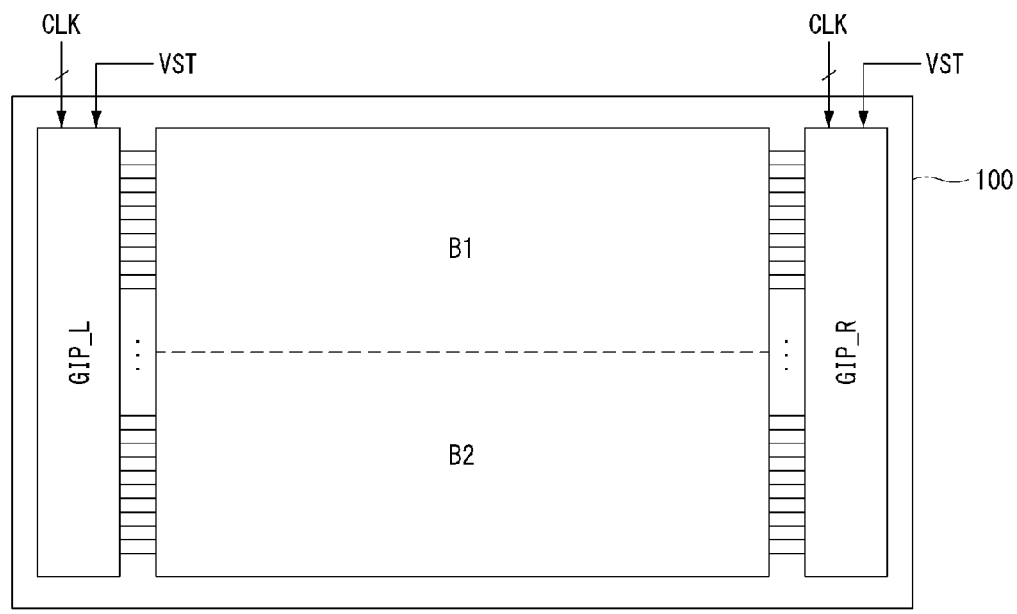
FIG. 5 illustrates an example where gate-in panel (GIP) circuits are respectively disposed on both sides of a display panel.
Figure 6:
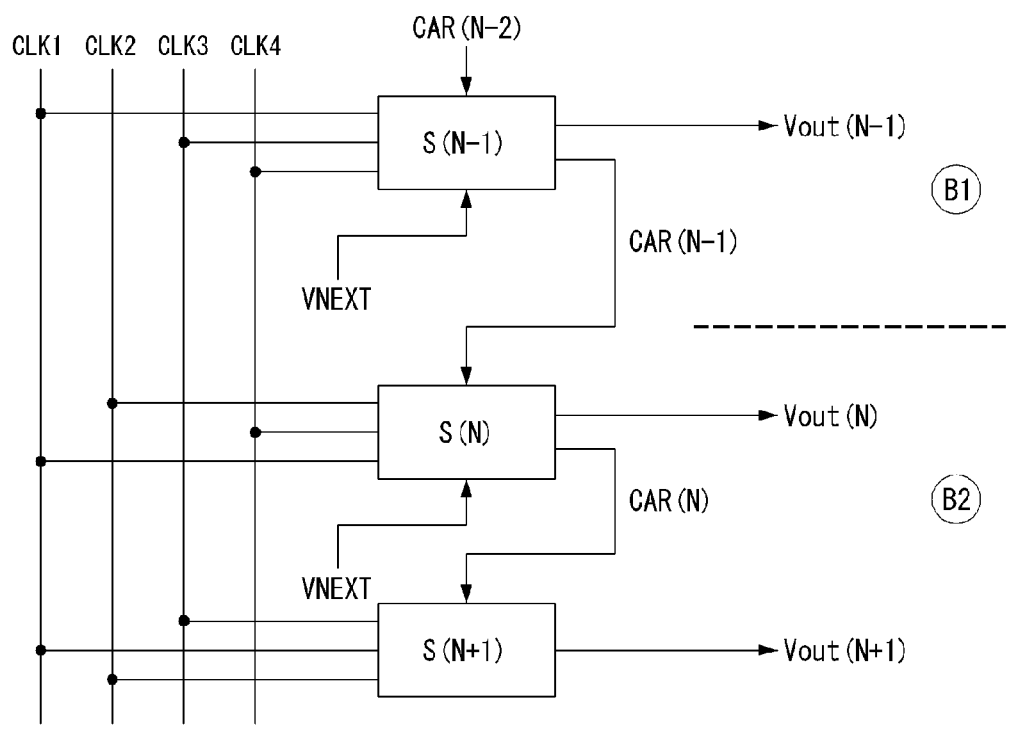
FIG. 6 schematically illustrates a part of a GIP circuit disposed at a boundary between adjacent blocks.

FIG. 5 illustrates an example where GIP circuits are respectively disposed on both sides of the display panel. FIG. 6 schematically illustrates a part of a GIP circuit disposed at a boundary between adjacent blocks.

The gate driver 104 may be implemented as a GIP circuit on a lower substrate of the display panel 100 on which the pixel array is formed, or may be implemented as a separate IC and attached to the lower substrate of the display panel 100.

The GIP circuit may be disposed at one edge of the display panel 100, or may be dividedly disposed at both edges of the display panel 100 as shown in FIG. 5. As shown in FIG. 5, GIP circuits GIP_L and GIP_R each include a shift register sequentially shifting a gate pulse under the control of the timing controller 106.

Transistors of the GIP circuits GIP_L and GIP_R may include at least one of a TFT including amorphous silicon (a-Si), an oxide TFT including oxide semiconductor, or a low-temperature polycrystalline silicon (LTPS) TFT including LTPS.

The transistors of the GIP circuits GIP_L and GIP_R may be manufactured as the TFTs including a-Si. Because a leakage current (i.e., an off-current) of the a-Si TFT flowing in an off-state is high, the a-Si TFT increases a discharge amount of a Q node during a touch sensing period. Due to the discharge, luminance is reduced at a boundary between adjacent blocks in B1 to BM, a phenomena referred to herein as "line dim." The display device according to the embodiments compensates for a decrease in a voltage of a Q node of a stage outputting a first gate pulse of a block that will be driven after the touch sensing period, thereby preventing the line dim.

Each of the GIP circuits GIP_L and GIP_R includes a shift register that receives a start signal VST and a gate shift clock CLK and sequentially outputs a gate pulse.

The first GIP circuit GIP_L is disposed outside the left side of the pixel array. The first GIP circuit GIP_L may be connected to odd-numbered gate lines G1, G3, . . . , Gn−1 of the pixel array and may sequentially output the gate pulse to the odd-numbered gate lines G1, G3, . . . , Gn−1. The second GIP circuit GIP_R is disposed outside the right side of the pixel array. The shift register of the second GIP circuit GIP_R may be connected to even-numbered gate lines G2, G4, Gn of the pixel array and may sequentially output the gate pulse to the even-numbered gate lines G2, G4, Gn.

Each of stages S(N−1) to S(N+1) of the shift register includes a pull-up transistor, a pull-down transistor, a Q node controlling the pull-up transistor, a QB node controlling the pull-down transistor, and a controller controlling the charge and the discharge of the Q node and the QB node. Each of the stages S(N−1) to S(N+1) pre-charges the Q node in response to a start signal received to a start signal input terminal or carry signals CAR(N−1) and CAR(N) received from a previous stage and increases a voltage of an output terminal to the gate high voltage VGH when gate shift clocks CLK1 to CLK4 are input, thereby starting to output the gate pulse.

The controller controls a charge timing and a discharge timing of the QB node. The controller increases the gate high voltage VGH in a low temperature environment in response to an output signal of a temperature sensor and can compensate for a reduction in an ON-current of the transistors at a low temperature. Since the controller may be implemented as any known circuit, a description of detailed circuit configuration and operation of the controller is omitted.

In FIG. 6, the (N−1)th stage S(N−1) is illustrated as a stage generating a last gate pulse in a (N−1)th block of the screen. An output signal Vout(N−1) of the (N−1)th stage S(N−1) is a gate pulse and/or a carry signal applied to a gate line of a last line (i.e., (N−1)th line) of a first block B1. The Nth stage S(N) is illustrated as a stage generating a first gate pulse in a Nth block of the screen driven after the touch sensing period. An output signal Vout(N) of the Nth stage S(N) is a gate pulse and/or a carry signal applied to a gate line of a first line (i.e., Nth line) of a second block B2 which starts to be driven after the touch sensing period. The carry signal output from the Nth stage S(N) is input to a start signal input terminal of a (N+1)th stage S(N+1) for outputting a second gate pulse in the second block B2 and pre-charges a Q node of the (N+1)th stage S(N+1).

Figure 7:
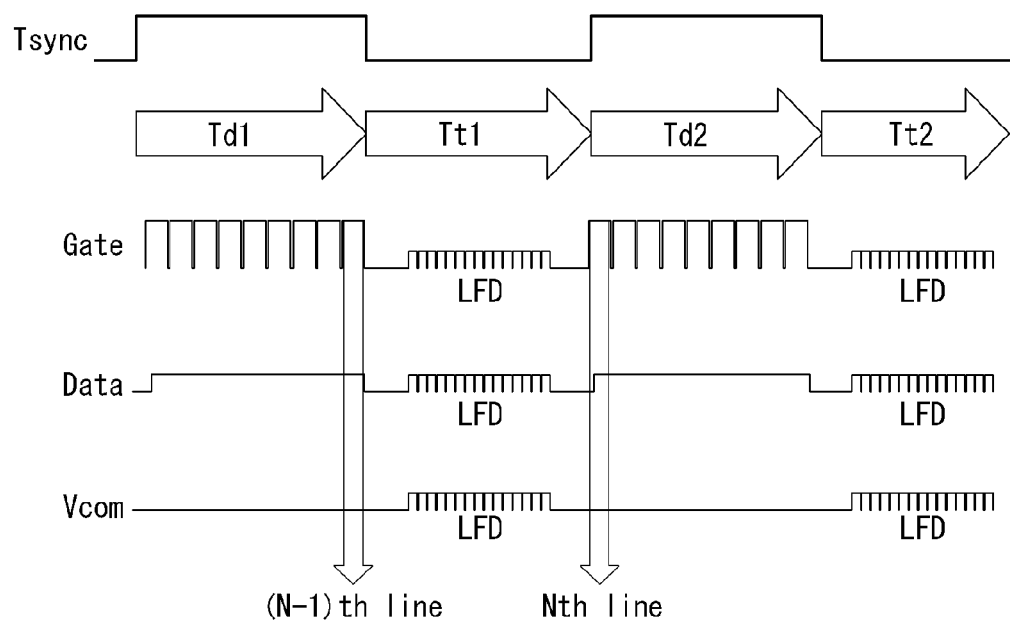
FIG. 7 is a waveform diagram illustrating a driving signal of a display device according to an embodiment.

FIG. 7 is a waveform diagram illustrating a driving signal of the display device according to one embodiment. In FIG. 7, "Gate" is a voltage applied to the gate lines G1 to Gn, "Data" is a voltage applied to the data lines S1 to Sm, and Vcom is a voltage applied to the touch electrode.

One frame period may be time-divided into display periods Td1 and Td2 and touch sensing periods Tt1 and Tt2. One frame period may be the time from one vertical synchronization pulse to the next vertical synchronization pulse (not shown). One touch sensing period is allocated between the display periods Td1 and Td2. During a first display period Td1, the display driving circuit (102, 104, and 106) writes current frame data to pixels of a first block B1 and updates an image reproduced on the first block B1 to the current frame data.

During the first display period Td1, a remaining block B2 other than the first block B1 holds previous frame data, and the touch sensing unit 110 does not drive the touch sensors with a touch sensor driving signal (touch sensing unit 110 may drive Vcom to the touch sensors). Subsequently, during a first touch sensing period Tt1, the touch sensing unit 110 sequentially drives all of the touch sensors with a touch sensor driving signal, senses a touch input, generates a touch report including coordinate information and identification information of each touch input, and transmits the touch report to the host system.

Subsequently, during a second display period Td2, the display driving circuit (102, 104, and 106) writes current frame data to pixels of a second block B2 and updates an image reproduced on the second block B2 to the current frame data. During the second display period Td2, the first block B1 holds current frame data, and the touch sensing unit 110 does not drive the touch sensors with a touch sensor driving signal. Subsequently, during a second touch sensing period Tt2, the touch sensing unit 110 sequentially drives all the touch sensors with a touch sensor driving signal, senses a touch input, generates a touch report including coordinate information and identification information of each touch input, and transmits the touch report to the host system.

During the touch sensing periods Tt1 and Tt2, the touch sensing unit 110 supplies a sensor driving signal to the touch sensor through the sensor lines L1 to Li, detects an amount of charge of the touch sensor before and after the touch input, compares the amount of charge with a threshold voltage, and determines the touch input.

The touch sensing unit 110 transmits coordinate information of a touch input to the host system in each touch sensing period. Thus, a touch report rate is greater than a frame rate. The frame rate is a frame frequency at which an image of one frame is written to the pixel array. The touch report rate is a speed at which the coordinate information of the touch input is generated. As the touch report rate increases, a coordinate recognition rate of the touch input increases. Hence, touch sensitivity is improved.

The in-cell touch sensor technology divides a common electrode of the pixels of the display panel 100 based on each touch sensor and uses the divided common electrodes as touch electrodes of touch sensors. For example, when the liquid crystal display is used as described above, the in-cell touch sensor technology divides a common electrode and uses divided common electrode patterns as the touch electrodes of self-capacitance touch sensors shown in FIGS. 2 and 3. Because the touch sensors are coupled with and form part of the pixels, a parasitic capacitance between the pixels and the touch sensors increases. Because the pixels and the touch sensors are coupled with each other through the parasitic capacitance, the pixels and the touch sensors may electrically adversely affect each other. Therefore, as shown in FIG. 4, the pixels and the touch sensors are time-division driven. Even if the time-division driving method is used, the touch sensitivity and the touch recognition accuracy of the touch sensors may be reduced due to the parasitic capacitance of the display panel 100.

During the touch sensing periods Tt1 and Tt2, the data driver 102 may supply an AC signal (referred to herein as a load free drive (LFD) signal) having the same phase and the same voltage as a sensor driving signal to the data lines S1 to Sm, so as to reduce a parasitic capacitance between the pixels 11 and the touch sensors. When there is no voltage difference between both ends of a parasitic capacitance between the data lines S1 to Sm and the touch sensors, a magnitude of the parasitic capacitance is reduced. Thus, when the sensor driving signal is supplied to the touch sensor, the magnitude of the parasitic capacitance between the data lines S1 to Sm and the touch sensors can be reduced when the LFD signal having the same phase and the same voltage as the sensor driving signal is supplied to the data lines S1 to Sm.

In the same manner as the data driver 102, during the touch sensing periods Tt1 and Tt2, the gate driver 104 may supply a LFD signal having the same phase and the same voltage as a sensor driving signal to the gate lines G1 to Gn, so as to reduce a parasitic capacitance between the pixels 11 and the touch sensors. When there is no voltage difference between both ends of a parasitic capacitance between the gate lines G1 to Gn and the touch sensors, a magnitude of the parasitic capacitance is reduced. Thus, when the sensor driving signal is supplied to the touch sensor, the magnitude of the parasitic capacitance between the gate lines G1 to Gn and the touch sensors can be reduced when the LFD signal having the same phase and the same voltage as the sensor driving signal is supplied to the gate lines G1 to Gn.

The touch sensing unit 110 can reduce the parasitic capacitance between the adjacent touch sensors by supplying the LFD signal to the sensor lines other than the sensor lines connected to the touch sensors sensing a current touch input.

When the LFD signal having the same phase as the sensor driving signal is supplied to the data lines S1 to Sm and the gate lines G1 to Gn of the display panel 100 and the touch sensors, which are not currently connected, during the touch sensing periods Tt1 and Tt2, an amount of charge of a parasitic capacitance of the display panel 100 may decrease. This is because the amount of charge of the parasitic capacitance may be reduced by reducing a voltage difference between both ends of the parasitic capacitance. Due to a decrease in the parasitic capacitance of the touch sensor, the touch sensing unit 110 can improve a signal-to-noise ratio (abbreviated to SNR or S/N) of the sensor driving signal, increase an operating margin of the touch sensing unit 110, and improve the touch input and the touch sensitivity.

In FIG. 7, "(N−1)th line" is an (N−1)th gate line supplied with a last gate pulse of an (N−1)th block of pixels, and "Nth line" is a Nth gate line supplied with a first gate pulse of a Nth block of pixels starting again to drive the pixel subsequent to the touch sensing periods Tt1 and Tt2. The Nth block of pixels is adjacent to the (N−1)th block of pixels and are driven subsequent to the Nth block of pixels.

Figure 8:
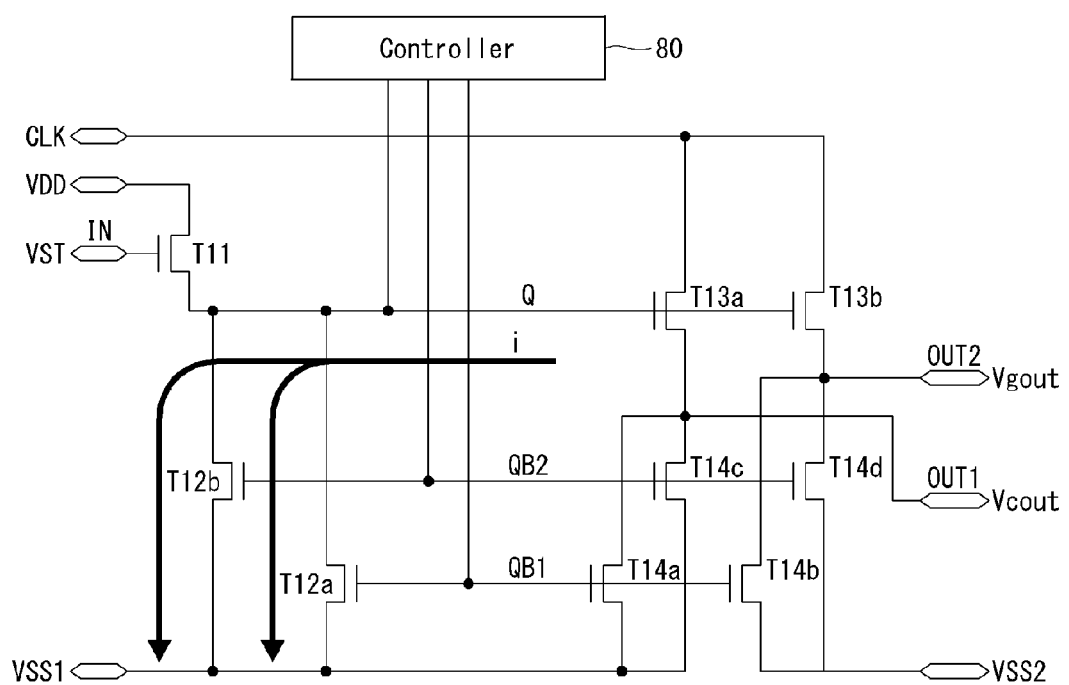
FIGS. 8 and 9 illustrate an example where a Q node is discharged during a touch sensing period.
Figure 9:
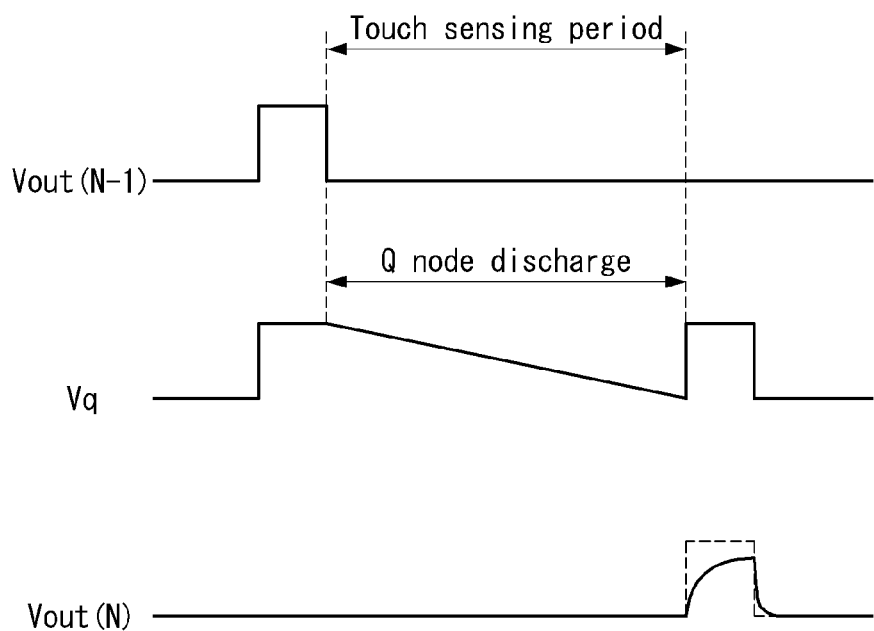

FIGS. 8 and 9 illustrate an example where a Q node is discharged during a touch sensing period.

Each of stages constituting the shift register includes a Q node, first and second QB nodes QB1 and QB2, a switching circuit connected to the Q node and the first and second QB nodes QB1 and QB2, and the like.

The stage outputs a gate pulse Vgout through a first output terminal and at the same time outputs a carry signal Cout through a second output terminal. The first output terminal is connected to the gate line of the display panel 100. The second output terminal is not connected to the gate line and is connected to a start signal input terminal of a next stage.

The switching circuit includes TFTs T11 to T14d.

TFT T11 supplies a high potential voltage VDD to the Q node in response to a start signal input through a start signal input terminal IN or a carry signal from a previous stage and pre-charges the Q node. The high potential voltage VDD may be set to the gate high voltage VGH.

TFT T12a discharges the Q node in response to the first QB node QB1 during a non-scan period. TFT T12b discharges the Q node in response to the second QB node QB2 during the non-scan period.

TFT T13a is a first pull-up transistor that is turned on in accordance with a voltage Vq of the Q node which rises when a clock CLK is input, supplies the clock CLK to a first output terminal OUT1, and increases a voltage of a first output signal Vcout. In this instance, the first output signal Vcout is generated from the first output terminal OUT1. The first output signal Vcout is a carry signal applied to a start signal input terminal of a next stage. A voltage of the clock CLK may be substantially equal to the gate high voltage VGH.

After the Q node is pre-charged to the gate high voltage VGH by the high potential voltage VDD supplied through the first TFT T11, the Q node increases by 2VGH due to bootstrapping when the clock CLK is input. As used herein, bootstrapping is a phenomenon in which the voltage Vq of the Q node sufficiently rises to a voltage capable of turning on the pull-up transistors T13a and T13b due to the coupling resulting from a parasitic capacitance between gates and drains of the pull-up transistors T13a and T13b when the clock CLK is input to the drains of the pull-up transistors T13a and T13b.

TFT T13b is a second pull-up transistor that is turned on in accordance with the voltage Vq of the Q node which rises when the clock CLK is input, supplies the clock CLK to a second output terminal OUT2, and increases a voltage of a second output signal Vgout. In this instance, the second output signal Vgout is generated from the second output terminal OUT2. The second output signal Vgout is a first gate pulse of the second block B2 which is first generated after the touch sensing period. A stage circuit illustrated in FIG. 8 is configured such that two pull-up transistors T13a and T13b are connected to one Q node and dividedly outputs the carry signal and the gate pulse. However, embodiments are not limited to the circuit configuration illustrated in FIG. 8. For example, the stage circuit may supply a gate pulse output through one pull-up transistor to the gate line and at the same time may transfer the gate pulse to a next stage as a carry signal.

The gate pulse is applied to one gate line during a very short scan period of one frame period, and a second low potential voltage VSS2 is applied during a remaining non-scan period. The scan period is approximately one horizontal period. A gate of a pull-down transistor is connected to the QB node, in order to discharge the gate line connected to an output terminal. The pull-down transistor is turned on during a charge period of the QB node to discharge the output terminal. Hence, the pull-down transistor reduces a voltage of the gate pulse to the second low potential voltage VSS2 and discharges a voltage of the gate line.

The pull-down transistor maintains an ON-state by the QB node that has been charged to the high potential voltage VDD for a long period of time. In this instance, a threshold voltage of the pull-down transistor may be shifted due to DC gate bias stress. In order to address the problem, when the two QB nodes QB1 and QB2 are disposed on the stage and are alternately charged, pull-down transistors T14a to T14d connected to the output terminals OUT1 and OUT2 may be AC driven. A controller 80 discharges the QB nodes QB1 and QB2 during a charge period of the Q node and turns off the pull-down transistors T14a to T14d. The controller 80 alternately charges the first QB node QB1 and the second QB node QB2 during the non-scan period and controls the AC drive of the pull-down transistors T14a to T14d.

TFT T14a is a first pull-down transistor that discharges a voltage of the first output terminal OUT1 to a first low potential voltage VSS1 in response to the first QB node QB1 during the non-scan period. TFT T14b is a second pull-down transistor that discharges a voltage of the second output terminal OUT2 to the second low potential voltage VSS2 in response to the first QB node QB1 during the non-scan period. TFT T14c is a third pull-down transistor that discharges the voltage of the first output terminal OUT1 to the first low potential voltage VSS1 in response to the second QB node QB2 during the non-scan period. TFT T14d is a fourth pull-down transistor that discharges the voltage of the second output terminal OUT2 to the second low potential voltage VSS2 in response to the second QB node QB2 during the non-scan period.

The first low potential voltage VSS1 may be substantially equal to the gate low voltage VGL, and the second low potential voltage VSS2 may be greater than the first low potential voltage VSS1. However, embodiments are not limited thereto. When the first low potential voltage VSS1 is low, an under-driving effect can be obtained in a falling period of the carry signal Vcout when the pull-down transistors T14a and T14b are turned on. A falling time of the carry signal Vcout and the gate pulse Vgout can decrease due to the under-driving effect. The under-driving effect can be obtained through a method for reducing the first low potential voltage VSS1. Because the under-driving effect cannot be obtained without reducing a low level voltage of the clock CLK and the second low potential voltage VSS2, power consumption can be improved by decreasing swing widths of the carry signal and the gate pulse. The carry signal Vcout is applied to first and second input terminals of the stage. Thus, when a low level voltage of the carry signal Vcout is sufficiently as low as the first low potential voltage VSS1, a shift of threshold voltages of TFTs T12a, T12b and T14a to T14c which undergo a positive gate bias stress can be compensated with a negative gate voltage.

When the stage circuit shown in FIG. 8 is applied to the Nth stage S(N) that starts to be first driven after the touch sensing period, a pre-charge voltage of the Q node may be discharged due to a leakage current of the Q node during the touch sensing period. The touch sensing period Tt1 is time longer than one horizontal period. When the voltage Vq of the Q node is discharged due to a leakage current (i) during the touch sensing period Tt1 as shown in FIG. 9, the voltage Vq of the Q node does not sufficiently rise normally. As a result, the voltage of the output signal Vout does not rise above the gate high voltage VGH. An output signal Vout shown in FIG. 9 is the Vgout and the Vcout shown in FIG. 8. Because a reduction in a voltage of the carry signal Vcout does not normally pre-charge a Q node of a next stage, an output of the gate driver 104 is not normally generated after the touch sensing period Tt1.

Some embodiments add a discharge blocking circuit to at least one stage of the shift register constituting the gate driver 104 and suppress the discharge of the Q node during the touch sensing period. The discharge blocking circuit will be described with reference to FIGS. 12 to 19.

FIGS. 10 to 16 illustrate a circuit including one QB node. However, embodiments are not limited thereto. For example, as shown in FIG. 8, the QB node may include two QB nodes that are alternately charged to the AC voltage, and the pull-down transistors may be respectively connected to the two QB nodes. Thus, a connection structure and an operation of the QB node and the pull-down transistor shown in FIGS. 10 to 16 may be implemented by the circuit shown in FIG. 8.

Circuits illustrated in FIGS. 10 to 16 are examples of outputting a gate pulse Vgout through a first output terminal and at the same time outputting a carry signal Cout(N) through a second output terminal. The first output terminal is connected to the gate line of the display panel 100. The second output terminal is not connected to the gate line and is connected to a start signal input terminal of a next stage. However, embodiments are not limited thereto. For example, the circuit illustrated in FIGS. 10 to 16 may supply a gate pulse output through one pull-up transistor to the gate line and at the same time transmit the gate pulse as a carry signal to a next stage.

Figure 10:
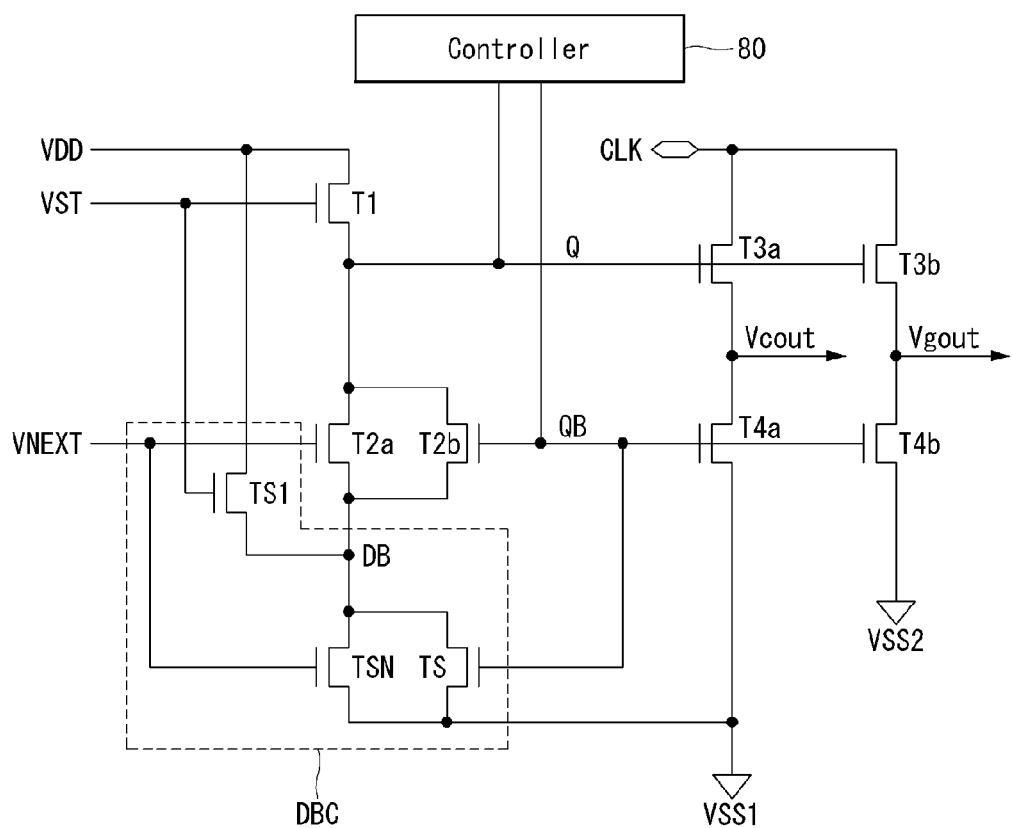
FIG. 10 is a circuit diagram of a gate driver circuit according to a first embodiment.
Figure 11:
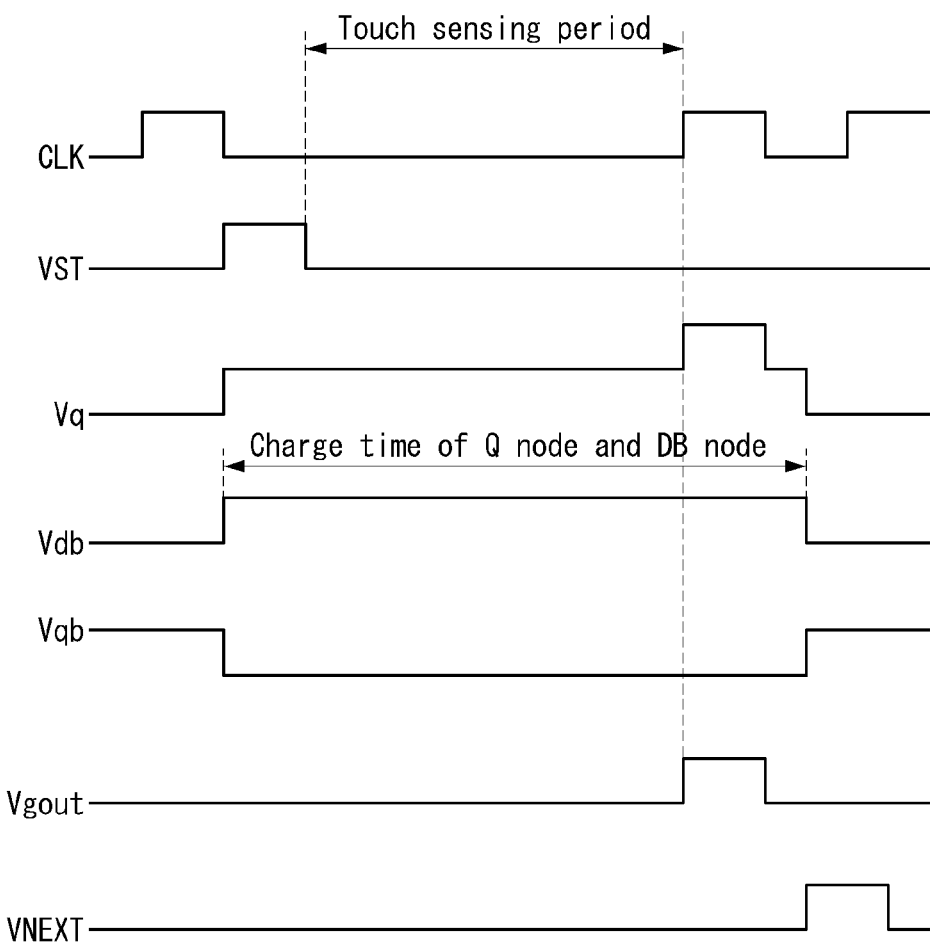
FIG. 11 is a waveform diagram illustrating an operation of a gate driver circuit shown in FIG. 10.

FIG. 10 is a circuit diagram of a gate driver circuit according to a first embodiment. FIG. 11 is a waveform diagram illustrating an operation of the gate driver circuit shown in FIG. 10.

Figures 18, 19:
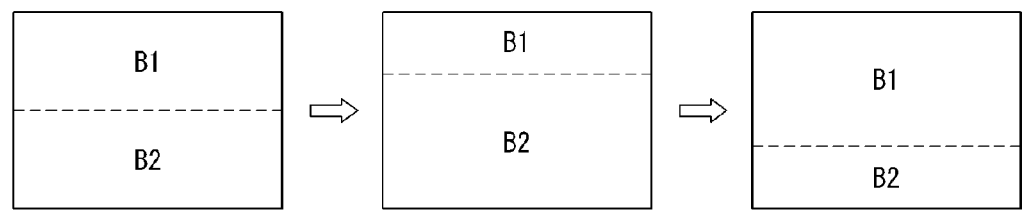
FIG. 18 illustrates an example where a discharge blocking circuit is applied to all of the stages constituting a shift register.
FIG. 19 illustrates an example where a boundary between screen blocks is changed.

The gate driver circuit according to the first embodiment includes a shift register that sequentially outputs a gate pulse through cascade-connected stages. The gate driver circuit may be applied to all the stages constituting the shift register of the gate driver 104 as shown in FIG. 18, or may be applied only to the stage that is first driven after the touch sensing period as shown in FIG. 17.

A stage includes a Q node, a QB node, a switching circuit connected to the Q node and the QB node, and the like. The Q node is a first control node connected to gates of pull-up transistors T3a and T3b. The QB node is a second control node connected to gates of pull-down transistors T4a and T4b.

The switching circuit includes a discharge blocking circuit DBC. The switching circuit further includes TFTs T1 to T4b. The second TFT switches on and off a discharge path between the Q node and a VSS1 terminal. The second TFT may include TFTs T2a and T2b, but is not limited thereto. Switches other than the discharge blocking circuit DBC may be implemented as the circuit shown in FIG. 8.

TFT T1 supplies a high potential voltage VDD to the Q node in response to a start signal input through a first input terminal or a carry signal from a previous stage and pre-charges the Q node. The high potential voltage VDD may be set to a gate high voltage VGH. TFT T1 includes a gate connected to a first input terminal, a drain supplied with the high potential voltage VDD, and a source connected to the Q node.

When the stage shown in FIG. 10 is the Nth stage S(N) shown in FIG. 6, a previous stage may be a (N−1)th stage S(N−1) or one of (N−4)th to (N−1)th stages. The previous stage is determined as a stage generating an output signal (i.e., a gate pulse) earlier than the Nth stage S(N) in consideration of a pulse width overlap period of the gate pulse.

TFT T2a discharges the Q node in response to an output signal VNEXT of a next stage input through a second input terminal. The output signal VNEXT may be a carry signal Vcout output from the next stage. TFT T2a includes a gate connected to the second input terminal, a drain connected to the Q node, and a source connected to a discharge blocking node (hereinafter referred to as "DB node").

When the stage shown in FIG. 10 is the Nth stage S(N) shown in FIG. 6, a next stage may be a (N+1)th stage S(N+1) or one of (N+1)th to (N+4)th stages. The next stage is determined as a stage generating an output at a falling timing of a gate pulse in consideration of a pulse width overlap period of the gate pulse.

TFT T2b discharges the Q node when the QB node is charged in response to a voltage of the QB node. TFT T2b includes a gate connected to the QB node, a drain connected to the Q node, and a source connected to the DB node The DB node is a discharge blocking node that is charged by the discharge blocking circuit DBC at the same time as when the Q node is charged, and is discharged by the discharge blocking circuit DBC at the same time as when the Q node is discharged. The DB node suppresses a discharge of the Q node by reducing a drain-to-source voltage of TFTs T2a and T2b that switch on and off the discharge path of the Q node during the touch sensing period. In some embodiments, the DB node is connected between a low potential voltage terminal supplied with a low potential voltage (e.g., VSS1) and the second transistor. In one embodiment, the DB node is coupled to the source terminal of the second transistor.

TFT T3a is a first pull-up transistor that is turned on in accordance with a voltage Vq of the Q node which rises when a clock CLK is input, supplies the clock CLK to a first output terminal, and increases a voltage of a first output signal Vcout. The first output signal Vcout is a carry signal applied to a first input terminal of a next stage. A voltage of the clock CLK may be substantially equal to the gate high voltage VGH. TFT T3a includes a gate connected to the Q node, a drain connected to a clock terminal to which the clock CLK is input, and a source connected to the first output terminal.

TFT T3b is a second pull-up transistor that is turned on in accordance with the voltage Vq of the Q node which rises when the clock CLK is input, supplies the clock CLK to a second output terminal, and increases a voltage of a second output signal Vgout. The second output signal Vgout is a first gate pulse of a second block B2 that is first generated after the touch sensing period. TFT T3b includes a gate connected to the Q node, a drain connected to the clock terminal, and a source connected to the second output terminal. The second output signal Vgout as a gate pulse is supplied to a first gate line of each block of the display panel 100 operated after the touch sensing period.

After the Q node is pre-charged to the gate high voltage VGH by the high potential voltage VDD supplied through the first TFT T11, the Q node increases by 2VGH due to bootstrapping when the clock CLK is input, and turns on the pull-up transistors T3a and T3b. A charge time of the Q node includes a pre-charge period and a bootstrapping period in which the clock CLK is input. As shown in FIG. 11, the Q node is discharged during a charge period of the QB node by a controller 80 and maintains an off-state. Further, as shown in FIG. 11, during the touch sensing period, the Q node is not discharged due to a charged voltage of the DB node and maintains a charging state.

TFT T4a is a first pull-down transistor that discharges a voltage of the first output terminal to a first low potential voltage VSS1 in response to a voltage Vqb of the QB node. TFT T4a includes a gate connected to the QB node, a drain connected to the first output terminal, and a source connected to a VSS1 terminal supplied with the first low potential voltage VSS1.

TFT T4b is a second pull-down transistor that discharges a voltage of the second output terminal to a second low potential voltage VSS2 in response to the voltage Vqb of the QB node. TFT T4b includes a gate connected to the QB node, a drain connected to the second output terminal, and a source connected to a VSS2 terminal supplied with the second low potential voltage VSS2.

The first low potential voltage VSS1 may be substantially equal to the gate low voltage VGL and may be less than the second low potential voltage VSS2. However, embodiments are not limited thereto. The first low potential voltage VSS1 may be set to be less than the second low potential voltage VSS2 in order to reduce a falling time of the gate pulse and reduce a leakage current of the TFTs of the pixels.

The QB node is discharged by the controller 80 during a charge period of the Q node. The QB node is discharged during a scan period and controls the pull-down transistors T4a and T4b in an OFF-state. The QB node is charged during a remaining period excluding the scan period from one frame period and discharges voltages of the output terminals to the second low potential voltage VSS2.

The controller 80 may discharge the QB node in accordance with a charge voltage of the Q node and discharge the Q node in accordance with a charge voltage of the QB node using an inverter circuit. When the QB node is divided into two QB nodes and is AC-driven as shown in FIG. 8, the controller 80 supplies an AC voltage to the two QB nodes and alternately charges and discharges the two QB nodes.

The discharge blocking circuit DBC charges the DB node during a charge period of the Q node to block a discharge path of the Q node and discharges the DB node during a discharge period of the Q node to form a discharge path of the Q node. The charge period of the Q node includes a pre-charge period of the Q node and a bootstrapping period according to the clock input. The discharge period of the Q node is a period in which the Q node is discharged and is held at the VSS1. Further, a charge period of the QB node is a period in which the QB node is charged and is held at the VDD (or the VGH). The discharge period of the QB node is a period in which the QB node is discharged and is held at the VSS1.

When the DB node is charged to the high potential voltage VDD, source voltages of TFTs T2a and T2b are the VDD. When the Q node is pre-charged to the VDD and at the same time the DB node is charged to the VDD, a leakage current does not flow in TFTs T2a and T2b by reducing a drain-to-source voltage Vds of TFTs T2a and T2b in an off-state of TFTs T2a and T2b. Therefore, a discharge path of the Q node is blocked. On the other hand, when a gate-to-source voltage of TFTs T2a and T2b is greater than a threshold voltage, TFTs T2a and T2b are turned on. Therefore, a discharge path is formed between the Q node and the VSS1 terminal through TFTs T2a and T2b, and the Q node is discharged.

More specifically, when a gate-to-source voltage Vgs of a transistor is less than a threshold voltage Vth, the transistor is turned off. Therefore, a drain current does not flow in the transistor. However, a leakage current may be generated in an off-state or a sub-threshold region of the transistor. When the gate-to-source voltage Vgs is really less than the threshold voltage Vth (i.e., (Vgs<Vth), a sub-threshold current is generated in the off-state or the sub-threshold region of the transistor. The leakage current or the sub-threshold current increases as a drain-to-source voltage Vds of the transistor increases. This phenomenon is well known in metal oxide semiconductor field effect transistors (MOSFETs).

The Q node and the DB node are equally charged to the high potential voltage VDD and equally discharged to the low potential voltage VSS by the discharge blocking circuit DBC. Thus, the Vds of the transistors T2a and T2b switching on and off the discharge path between the Q node and the VSS1 terminal is minimized to zero (i.e., Vds=0) during the touch sensing period. As a result, as shown in FIG. 11, the voltage Vq of the Q node is held at the VDD (or the VGH) during the touch sensing period.

It may be considered to increase the VSS1 during the touch sensing period without the discharge blocking circuit DBC. However, this method may discharge the voltage of the pixels by charging the voltage of the Q nodes of the stages operating in the display period. On the other hand, because the discharge blocking circuit DBC blocks the discharge path only during the charge period of the Q node, the above-described malfunction can be prevented.

The discharge blocking circuit DBC includes a first discharge control switch TS1, a second discharge control switch TSN, and a third discharge control switch TS. The discharge control switches TS1, TSN, and TS are implemented as TFTs.

The first discharge control switch TS1 is turned on at the same time as when the TFT T1 is turned on, and charges the DB node. Due to the first discharge control switch TS1, the DB node is charged at the same time as when the Q node is charged. The first discharge control switch TS1 supplies the high potential voltage VDD to the DB node in response to a start signal input through the first input terminal or a carry signal from a previous stage, thereby charging the DB node to the high potential voltage VDD. The first discharge control switch TS1 includes a gate connected to the first input terminal, a drain supplied with the high potential voltage VDD, and a source connected to the DB node.

The second discharge control switch TSN is turned on at the same time as when TFT T2a is turned on, and discharges the DB node. Due to the second discharge control switch TSN, the DB node is discharged at the same time as when the Q node is discharged. The second discharge control switch TSN discharges the DB node in response to an output signal VNEXT of a next stage input through the second input terminal. The second discharge control switch TSN includes a gate connected to the second input terminal, a drain connected to the DB node, and a source connected to the VSS1 terminal.

The third discharge control switch TS is turned on at the same time as when TFT T2b is turned on, and discharges the DB node. Due to the third discharge control switch TS, the DB node is discharged for a charge time of the QB node and is held at the VSS1. The third discharge control switch TS discharges the DB node when the QB node is charged in response to the voltage of the QB node. The third discharge control switch TS includes a gate coupled to the QB node, a drain coupled to the DB node, and a source coupled to the VSS1 terminal.

In FIG. 11, "Vq" is a voltage of the Q node of the Nth stage; "Vdb" is a voltage of the DB node of the Nth stage; "Vqb" is a voltage of the QB node of the Nth stage; "Vgout" is an output voltage of the Nth stage and is the gate pulse applied to the gate line; and "VNEXT" is an output voltage of a next stage generating an output after the output of the Nth stage. The discharge blocking circuit DBC charges and discharges the DB node at the same time as the Q node and reduces the leakage current of the transistors T2a and T2b on the discharge path of the Q node during the touch sensing period, thereby blocking the discharge of the Q node during the touch sensing period.

The discharge blocking circuit DBC is not limited to the gate driver circuit shown in FIG. 10 and may be applied to various gate driver circuits. For example, the discharge blocking circuit DBC may be applied to the switching circuit shown in FIG. 8. The configuration of the discharge blocking circuit DBC may be modified as shown in FIGS. 12 to 16, and thus is not limited to FIG. 10. The QB node may be omitted in the gate driver circuit, in order to simplify the configuration of the gate driver circuit. In this instance, the third discharge control switch TS connected to the QB node may be omitted in the discharge blocking circuit DBC.

Figure 12:
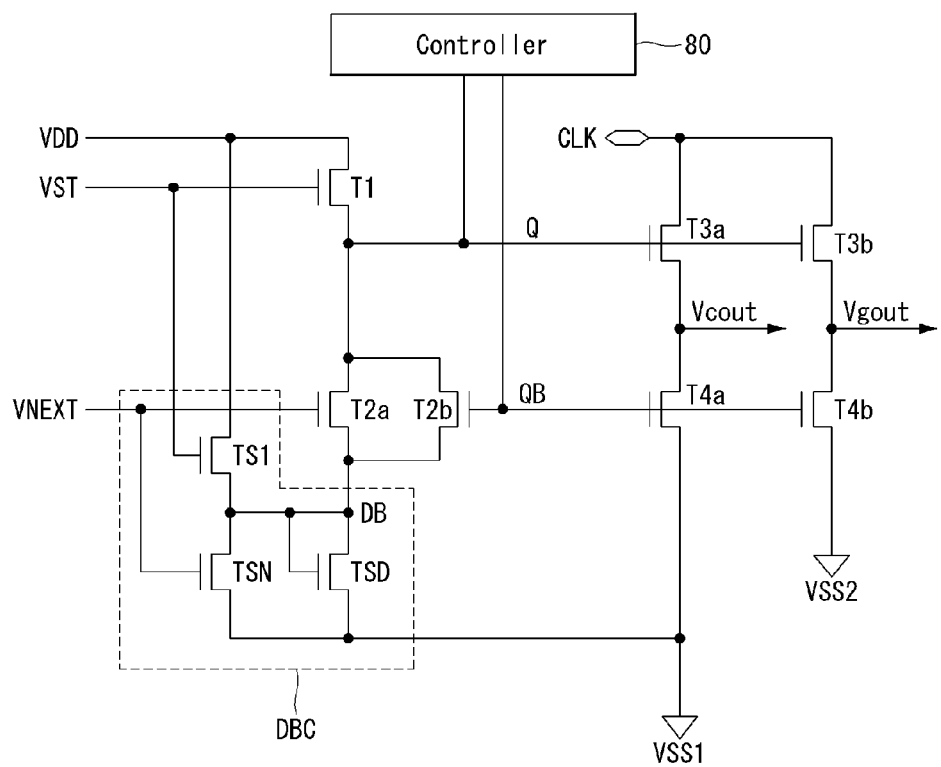
FIG. 12 is a circuit diagram of a gate driver circuit according to a second embodiment.

FIG. 12 is a circuit diagram of a gate driver circuit according to a second embodiment. Structures and components identical or equivalent to those illustrated in FIG. 10 are designated with the same reference numerals in the second embodiment, and a further description may be briefly made or may be entirely omitted.

The gate driver circuit according to the second embodiment includes a shift register that sequentially outputs a gate pulse through cascade-connected stages. The gate driver circuit may be applied to all the stages constituting the shift register, or may be applied only to a stage that is first driven after a touch sensing period.

A stage includes a Q node, a QB node, a switching circuit connected to the Q node and the QB node, and the like. The switching circuit includes TFTs T1 to T4b and a discharge blocking circuit DBC.

The discharge blocking circuit DBC charges a DB node during a charge period of the Q node to block a discharge path of the Q node and discharges the DB node during a discharge period of the Q node to form a discharge path of the Q node.

The discharge blocking circuit DBC includes a first discharge control switch TS1, a second discharge control switch TSN, and a diode TSD.

The first discharge control switch TS1 is turned on and off at the same time as TFT T1. Due to the first discharge control switch TS1, the DB node is charged at the same time as when the Q node is charged. The first discharge control switch TS1 supplies a high potential voltage VDD to the DB node in response to a start signal input through a first input terminal or a carry signal from a previous stage, thereby charging the DB node to the high potential voltage VDD. The first discharge control switch TS1 includes a gate connected to the first input terminal, a drain supplied with the high potential voltage VDD, and a source connected to the DB node.

The second discharge control switch TSN is turned on and off at the same time as TFT T2a. Due to the second discharge control switch TSN, the DB node is discharged at the same time as when the Q node is discharged. The second discharge control switch TSN discharges the DB node in response to an output signal VNEXT of a next stage input through a second input terminal. The second discharge control switch TSN includes a gate connected to the second input terminal, a drain connected to the DB node, and a source connected to a VSS1 terminal.

The diode TSD may be implemented by connecting a gate and a drain of a TFT. When a voltage of the DB node is greater than a first low potential voltage VSS1 and is equal to or greater than a threshold voltage of the diode TSD, the diode TSD is turned on and discharges the DB node. When the DB node is discharged, the diode TSD is turned off and blocks a discharge path of the Q node. Thus, when the Q node is discharged during the touch sensing period and the voltage of the Q node is less than the threshold voltage of the diode TSD, the discharge path of the Q node is blocked and the Q node is no longer discharged. The discharge blocking circuit DBC may be applied to the gate driver circuits shown in FIGS. 8 and 10 to 16, and also to the gate driver circuit not having the QB node.

Figure 13:
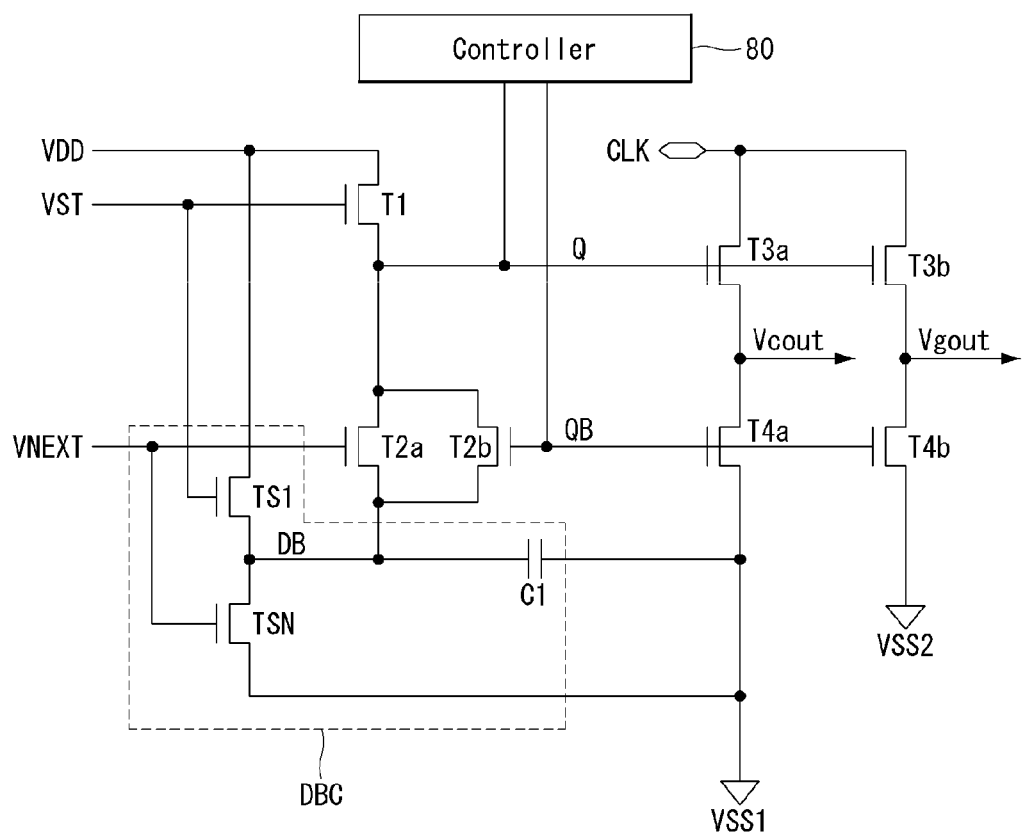
FIG. 13 is a circuit diagram of a gate driver circuit according to a third embodiment.

FIG. 13 is a circuit diagram of a gate driver circuit according to a third embodiment. Structures and components identical or equivalent to those illustrated in FIG. 10 are designated with the same reference numerals in the third embodiment, and a further description may be briefly made or may be entirely omitted.

The gate driver circuit according to the third embodiment includes a shift register that sequentially outputs a gate pulse through cascade-connected stages. The gate driver circuit may be applied to all the stages constituting the shift register, or may be applied only to a stage that is first driven after a touch sensing period.

A stage includes a Q node, a QB node, a switching circuit connected to the Q node and the QB node, and the like. The switching circuit includes TFTs T1 to T4b and a discharge blocking circuit DBC.

The discharge blocking circuit DBC charges a DB node during a charge period of the Q node to block a discharge path of the Q node and discharges the DB node during a discharge period of the Q node to form a discharge path of the Q node.

The discharge blocking circuit DBC includes a first discharge control switch TS1, a second discharge control switch TSN, and a capacitor C1.

The first discharge control switch TS1 is turned on and off at the same time as TFT T1. Due to the first discharge control switch TS1, the DB node is charged at the same time as when the Q node is charged. The first discharge control switch TS1 supplies a high potential voltage VDD to the DB node in response to a start signal input through a first input terminal or a carry signal from a previous stage, thereby charging the DB node to the high potential voltage VDD. The first discharge control switch TS1 includes a gate connected to the first input terminal, a drain supplied with the high potential voltage VDD, and a source connected to the DB node.

The second discharge control switch TSN is turned on and off at the same time as TFT T2a. The second discharge control switch TSN includes a gate connected to the second input terminal, a drain connected to the DB node, and a source connected to a VSS1 terminal and the drain of the second discharge control switch TSN.

The capacitor C1 is connected between the DB node and the VSS1 terminal and holds a voltage of the DB node. As a capacitance of the capacitor C1 increases, a discharge time of the DB node is delayed. As a result, a voltage Vq of the Q node does not fall below a voltage capable of the bootstrapping during the touch sensing period. The discharge blocking circuit DBC may be applied to the gate driver circuits shown in FIGS. 8 and 10 to 16, and also to the gate driver circuit not having the QB node.

Figure 14:
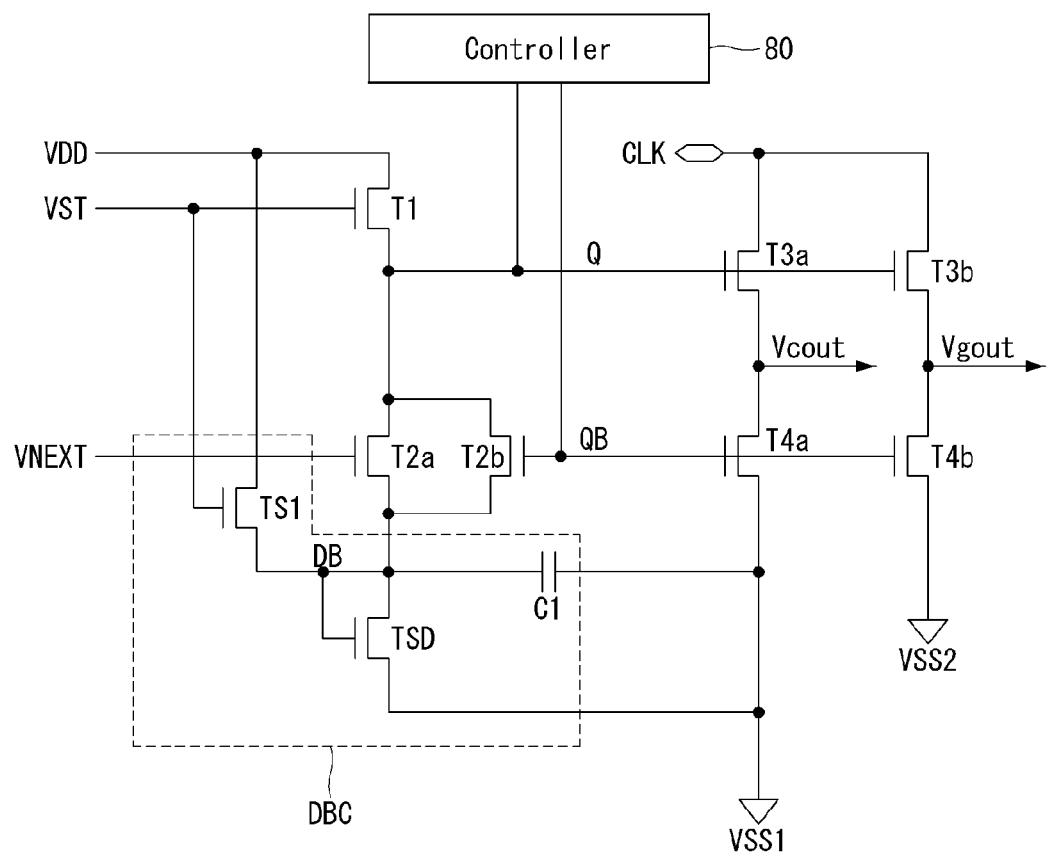
FIG. 14 is a circuit diagram of a gate driver circuit according to a fourth embodiment.

FIG. 14 is a circuit diagram of a gate driver circuit according to a fourth embodiment. Structures and components identical or equivalent to those illustrated in FIG. 10 are designated with the same reference numerals in the fourth embodiment, and a further description may be briefly made or may be entirely omitted.

Referring to FIG. 14, the gate driver circuit according to the fourth embodiment includes a shift register that sequentially outputs a gate pulse through cascade-connected stages. The gate driver circuit may be applied to all the stages constituting the shift register, or may be applied only to a stage that is first driven after a touch sensing period.

A stage includes a Q node, a QB node, a switching circuit connected to the Q node and the QB node, and the like. The switching circuit includes TFTs T1 to T4b and a discharge blocking circuit DBC.

The discharge blocking circuit DBC charges a DB node during a charge period of the Q node to block a discharge path of the Q node and discharges the DB node during a discharge period of the Q node to form a discharge path of the Q node.

The discharge blocking circuit DBC includes a first discharge control switch TS1, a diode TSD, and a capacitor C1.

The first discharge control switch TS1 is turned on and off at the same time as TFT T1. Due to the first discharge control switch TS1, the DB node is charged at the same time as when the Q node is charged. The first discharge control switch TS1 supplies a high potential voltage VDD to the DB node in response to a start signal input through a first input terminal or a carry signal from a previous stage, thereby charging the DB node to the high potential voltage VDD. The first discharge control switch TS1 includes a gate connected to the first input terminal, a drain supplied with the high potential voltage VDD, and a source connected to the DB node.

When a voltage of the DB node is greater than a first low potential voltage VSS1 and is equal to or greater than a threshold voltage of the diode TSD, the diode TSD is turned on and discharges the DB node. When the DB node is discharged, the diode TSD is turned off and blocks a discharge path of the Q node. Thus, when the Q node is discharged during the touch sensing period and the voltage of the Q node is less than the threshold voltage of the diode TSD, the discharge path of the Q node is blocked and the Q node is no longer discharged.

The capacitor C1 is connected between the DB node and the VSS1 terminal and holds a voltage of the DB node. As a capacitance of the capacitor C1 increases, a discharge time of the DB node becomes slower. As a result, a voltage Vq of the Q node does not fall below a voltage capable of the bootstrapping during the touch sensing period.

Figure 15:
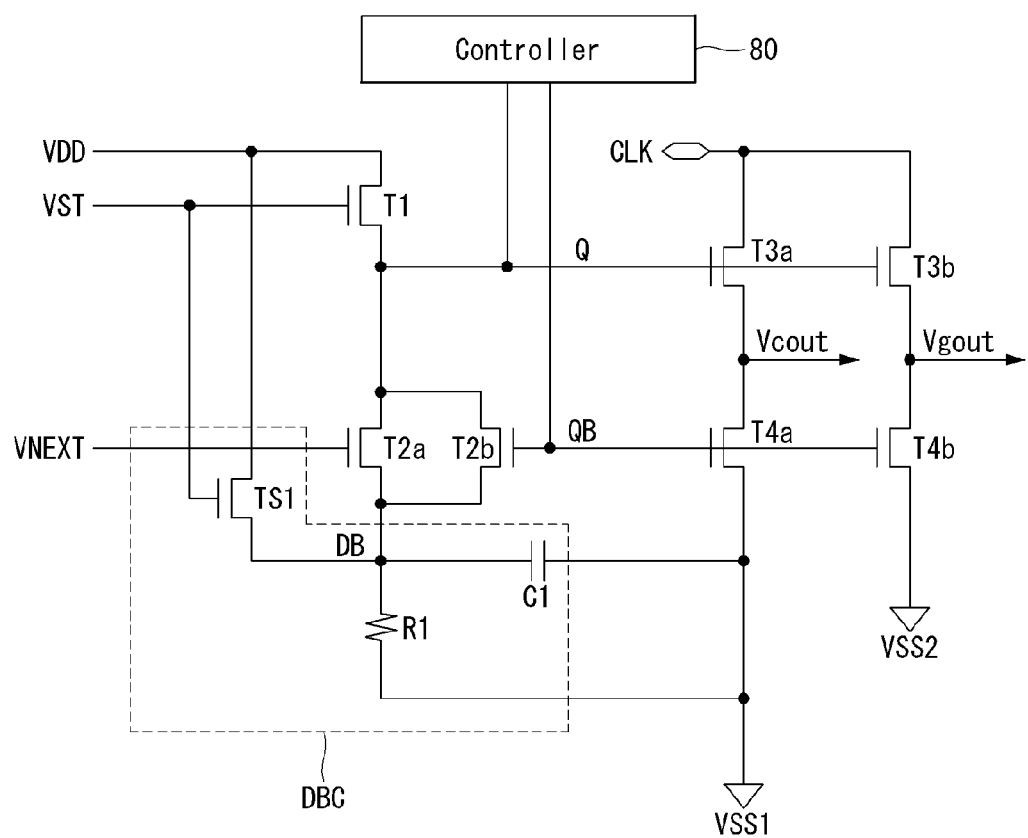
FIG. 15 is a circuit diagram of a gate driver circuit according to a fifth embodiment.

FIG. 15 is a circuit diagram of a gate driver circuit according to a fifth embodiment. Structures and components identical or equivalent to those illustrated in FIG. 10 are designated with the same reference numerals in the fifth embodiment, and a further description may be briefly made or may be entirely omitted.

Referring to FIG. 15, the gate driver circuit according to the fifth embodiment includes a shift register that sequentially outputs a gate pulse through cascade-connected stages. The gate driver circuit may be applied to all the stages constituting the shift register, or may be applied only to a stage that is first driven after a touch sensing period.

A stage includes a Q node, a QB node, a switching circuit connected to the Q node and the QB node, and the like. The switching circuit includes TFTs T1 to T4b and a discharge blocking circuit DBC.

The discharge blocking circuit DBC charges a DB node during a charge period of the Q node to block a discharge path of the Q node and discharges the DB node during a discharge period of the Q node to form a discharge path of the Q node.

The discharge blocking circuit DBC includes a first discharge control switch TS1, a resistor R1, and a capacitor C1.

The first discharge control switch TS1 is turned on and off at the same time as TFT T1. Due to the first discharge control switch TS1, the DB node is charged at the same time as when the Q node is charged. The first discharge control switch TS1 supplies a high potential voltage VDD to the DB node in response to a start signal input through a first input terminal or a carry signal from a previous stage, thereby charging the DB node to the high potential voltage VDD. The first discharge control switch TS1 includes a gate connected to the first input terminal, a drain supplied with the high potential voltage VDD, and a source connected to the DB node.

When the DB node is discharged, the resistor R1 and the capacitor C1 delay a discharge time of a DB voltage. The resistor R1 limits a discharge voltage of the DB node in the touch sensing period, and the capacitor C1 holds a voltage of the DB node. The resistor R1 and the capacitor C1 suppress a discharge of the Q node so that the voltage of the DB node is held at a voltage level capable of the bootstrapping of the Q node during the touch sensing period by delaying a discharge time required to discharge the voltage of the DB node to a first low potential voltage VSS1. The resistor R1 is connected between the DB node and a VSS1 terminal, and the capacitor C1 is also connected between the DB node and the VSS1 terminal. One electrode of the capacitor C1 is connected to the DB node, and the other electrode of the capacitor C1 is connected to a source of TFT T4a and the VSS1 terminal.

Figure 16:
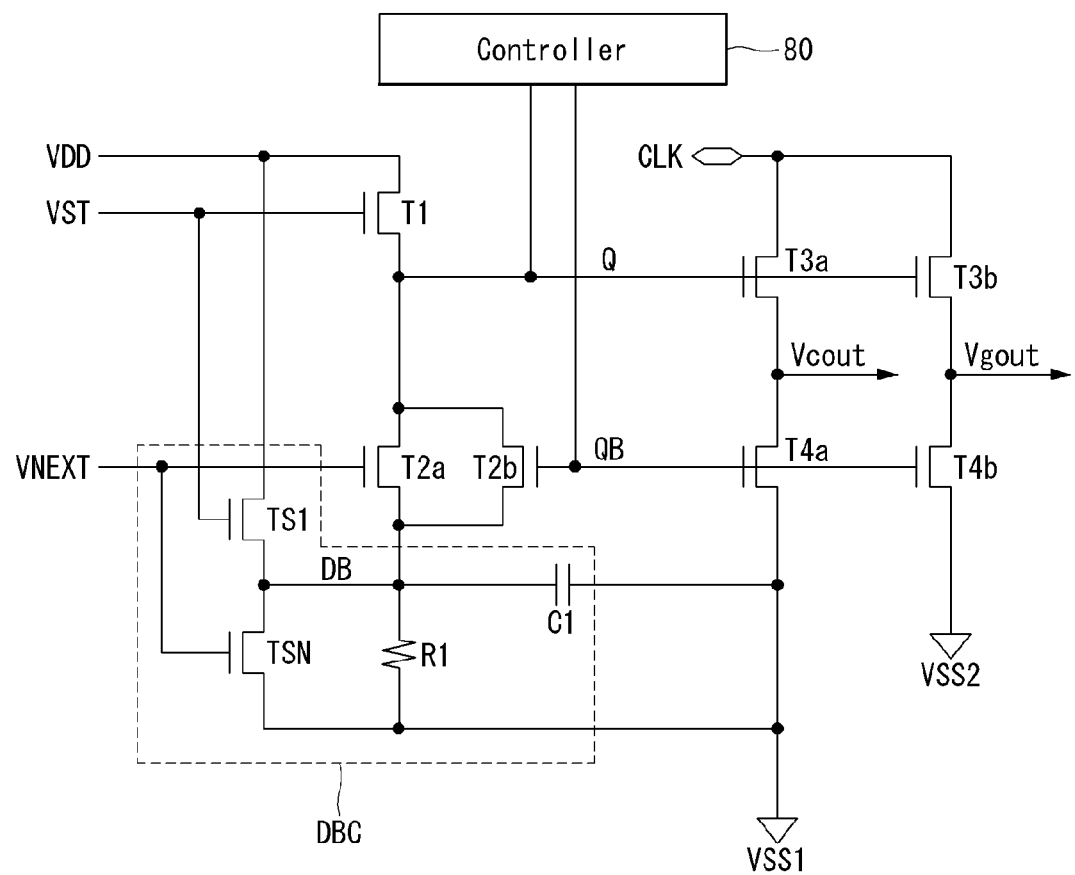
FIG. 16 is a circuit diagram of a gate driver circuit according to a sixth embodiment.

FIG. 16 is a circuit diagram of a gate driver circuit according to a sixth embodiment. Structures and components identical or equivalent to those illustrated in FIG. 10 are designated with the same reference numerals in the sixth embodiment, and a further description may be briefly made or may be entirely omitted.

Referring to FIG. 16, the gate driver circuit according to the sixth embodiment includes a shift register that sequentially outputs a gate pulse through cascade-connected stages. The gate driver circuit may be applied to all the stages constituting the shift register, or may be applied only to a stage that is first driven after a touch sensing period.

A stage includes a Q node, a QB node, a switching circuit connected to the Q node and the QB node, and the like. The switching circuit includes TFTs T1 to T4b and a discharge blocking circuit DBC.

The discharge blocking circuit DBC charges a DB node during a charge period of the Q node to block a discharge path of the Q node and discharges the DB node during a discharge period of the Q node to form a discharge path of the Q node.

The discharge blocking circuit DBC includes a first discharge control switch TS1, a second discharge control switch TSN, a resistor R1, and a capacitor C1.

The first discharge control switch TS1 is turned on and off at the same time as TFT T1. Due to the first discharge control switch TS1, the DB node is charged at the same time as when the Q node is charged. The first discharge control switch TS1 supplies a high potential voltage VDD to the DB node in response to a start signal input through a first input terminal or a carry signal from a previous stage, thereby charging the DB node to the high potential voltage VDD. The first discharge control switch TS1 includes a gate connected to the first input terminal, a drain supplied with the high potential voltage VDD, and a source connected to the DB node.

The second discharge control switch TSN is turned on and off at the same time as TFT T2a. The second discharge control switch TSN includes a gate connected to the second input terminal, a drain connected to the DB node, and a source connected to a VSS1 terminal.

The resistor R1 and the capacitor C1 suppress a discharge of the Q node so that a voltage of the DB node is held at a voltage level capable of the bootstrapping of the Q node during the touch sensing period by delaying a discharge time required to discharge the voltage of the DB node to a first low potential voltage VSS1. The resistor R1 is connected between the DB node and the VSS1 terminal, and the capacitor C1 is also connected between the DB node and the VSS1 terminal. One electrode of the capacitor C1 is connected to the DB node, and the other electrode of the capacitor C1 is connected to a source of TFT T4a and the VSS1 terminal.

FIG. 17 illustrates an example where a discharge blocking circuit is applied to some of stages constituting a shift register. FIG. 18 illustrates an example where a discharge blocking circuit is applied to all of stages constituting a shift register.

In FIGS. 17 and 18, "A" is a circuit to which a discharge blocking circuit DBC is not applied; "B" is a circuit to which the discharge blocking circuit DBC is applied; S1 to S1085 are stage numbers; and B1 to B35 are block numbers. In the remaining blocks B2 to B35 except the first block B1, a first stage receives a start signal VST through a first input terminal, and remaining stages S2 to S1085 receive an output signal of a previous stage through the first input terminal. The stages S1 to S1084 receive an output signal of a next stage through a second input terminal, and the stage S1085 receives an output signal of a dummy stage (not shown) through the second input terminal. The circuit A may be the circuit shown in FIG. 8, but is not limited thereto. The circuit B may be one of the circuits shown in FIGS. 10 to 16.

Because the voltage of the Q node in the stages S32, S63 and S1055, which are driven immediately after the touch sensing period, is discharged during the touch sensing period, the stages S32, S63 and S1055 may not be normally bootstrapped. It is preferable that the stages S32, S63 and S1055 are implemented by the circuit B, in which the discharge blocking circuit is embedded. Because the Q node in the remaining stages S1-S31, S33-S62, . . . , and S1056-S1085 other than the stages S32, S63 and S1055 which are driven immediately after the touch sensing period, has a short discharge time, the remaining stages S1-S31, S33-S62, . . . , and S1056-S1085 can be normally bootstrapped although they do not include the discharge blocking circuit. Thus, the stages S1-S31, S33-S62, . . . , and S1056-S1085, in which the Q node has the short discharge time, can be normally bootstrapped irrespective of the presence or absence of the discharge blocking circuit.

As shown in FIG. 17, when only some S32, S63 and S1055 of stages S1 to S1085 constituting a shift register are implemented by the circuit B in which the discharge blocking circuit is embedded, an area occupied by a GIP circuit can decrease. Therefore, a size of a non-display area (i.e., a bezel) outside the pixel array can decrease. Thus, the arrangement of the circuits A and B shown in FIG. 17 can achieve a narrow bezel of the display device. However, because a boundary between the blocks in the circuit arrangement shown in FIG. 17 cannot be compatible with other models, a photomask or the like has to be newly designed.

A driving method illustrated in FIG. 19 is an example of varying a position of a boundary between blocks so that a line dim at the boundary between the blocks due to a touch sensing period is not visible in an in-cell touch driving method. In the driving method, the position of the boundary between the blocks is controlled by the timing controller 106. When the position of the circuit B, in which the discharge blocking circuit is embedded, is fixed as shown in FIG. 17, the driving method for varying the position of the boundary between the blocks as shown in FIG. 19 cannot be used.

The circuit B, to which the discharge blocking circuit is applied, may be embedded in all of stages S1 to S1085 constituting a shift register. In this instance, the bezel size may increase due to an increase in a size of the GIP circuit. However, the discharge blocking circuit may be applied to the shift register in other models, in which the position of the boundary between the blocks varies, without changing the circuit configuration. Further, when the position of the boundary between the blocks varies as shown in FIG. 19, the discharge blocking circuit may be applied to the shift register in the circuit B, to which the discharge blocking circuit is applied to the all the stages S1 to S1085, without changing the circuit configuration.

Figure 20:
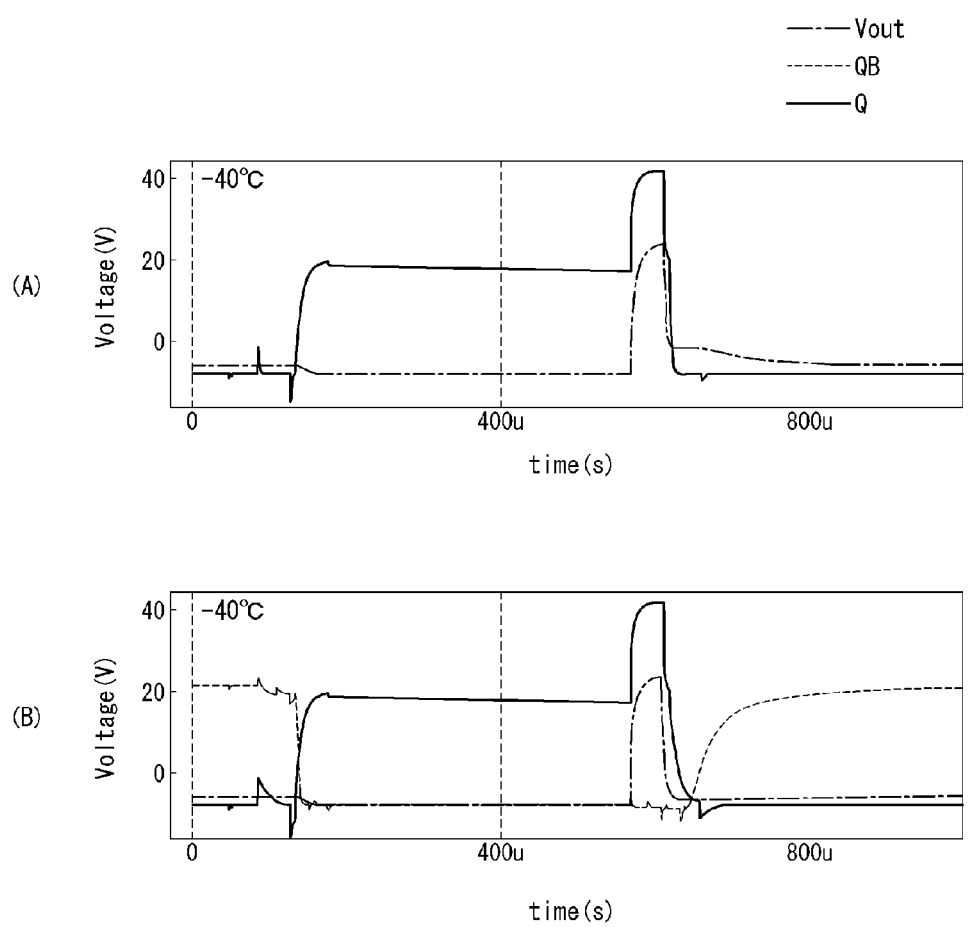
FIGS. 20 to 22 illustrate experimental results depending on the presence or absence of a discharge blocking circuit.
Figure 21:
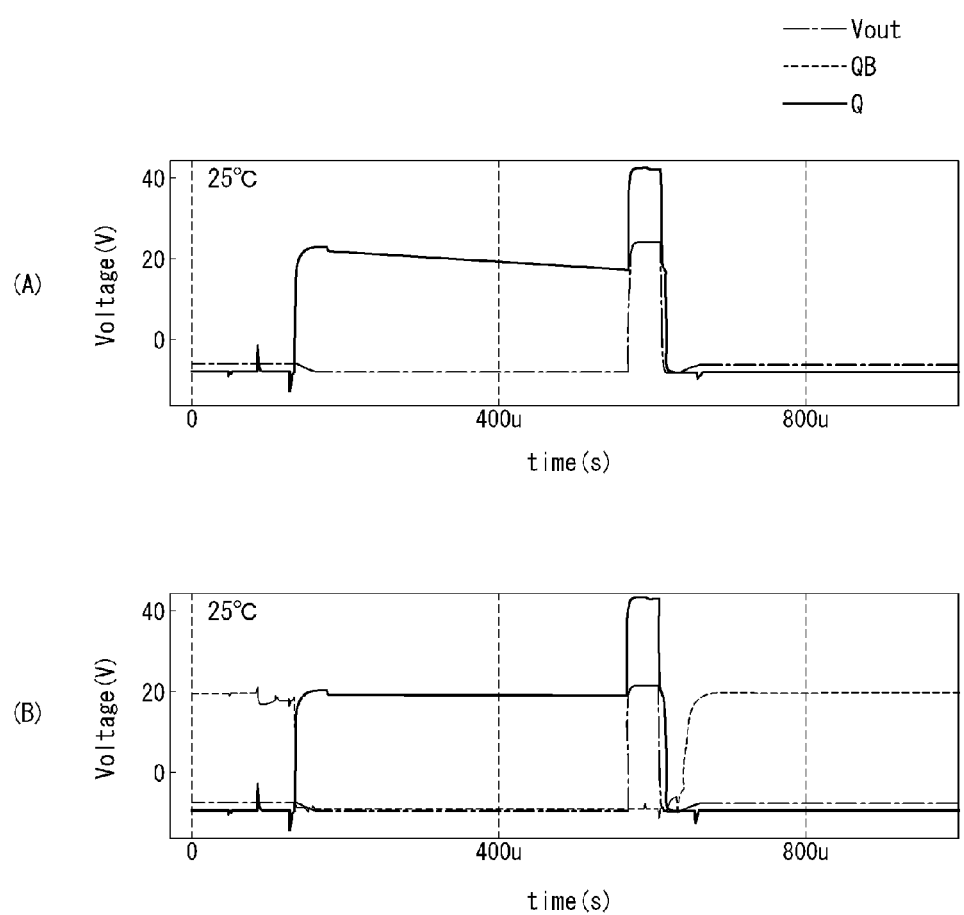
Figure 22:
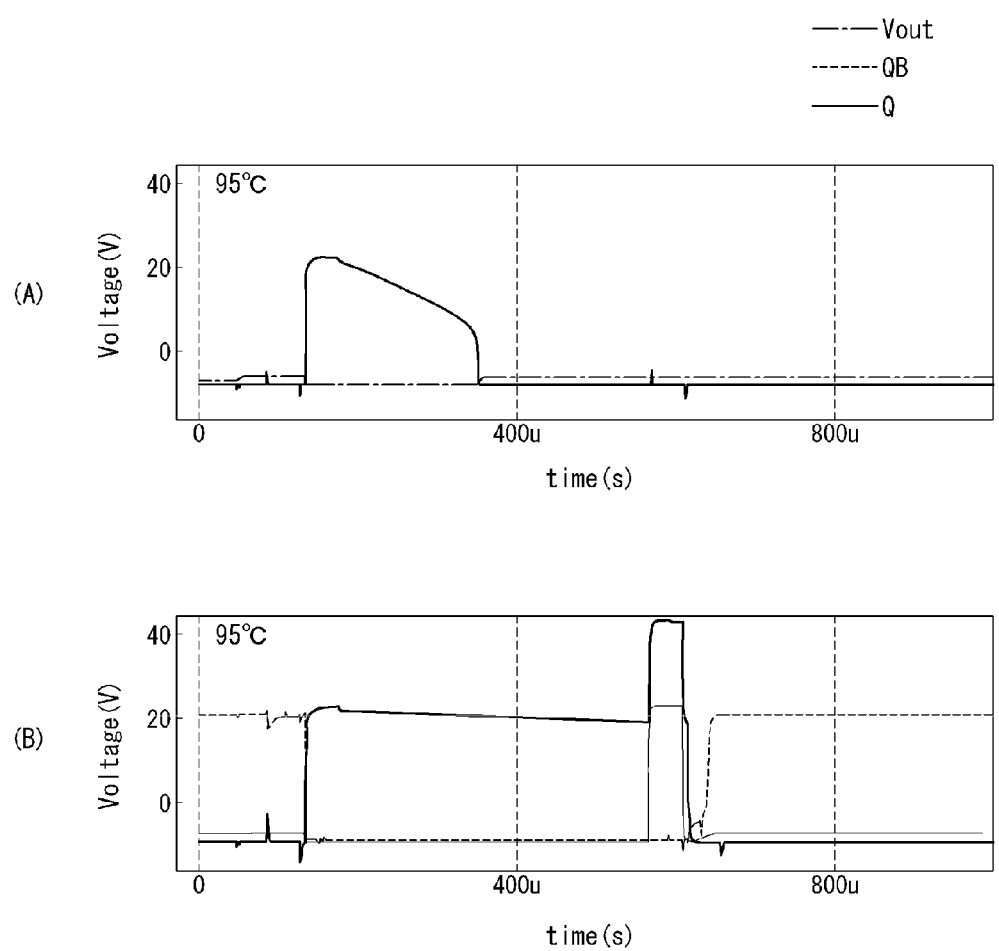

FIGS. 20 to 22 illustrate experimental results depending on the presence or absence of a discharge blocking circuit. A discharge blocking circuit applied to experiments illustrated in FIGS. 20 to 22 is a circuit illustrated in FIG. 10. In FIGS. 20 to 22, X-axis is time (unit: μs), and Y-axis is a voltage (unit: volts). FIG. 20 illustrates an experimental result of measuring a voltage of a Q node, a voltage of a QB node, and a voltage of an output signal in a touch sensing period when a circuit A not including a discharge blocking circuit and a circuit B including a discharge blocking circuit are driven through the same in-cell touch driving method in an environment of −40° C. FIG. 21 illustrates an experimental result of measuring a voltage of a Q node, a voltage of a QB node, and a voltage of an output signal in a touch sensing period when a circuit A not including a discharge blocking circuit and a circuit B including a discharge blocking circuit are driven through the same in-cell touch driving method in an environment of 25° C. FIG. 22 illustrates an experimental result of measuring a voltage of a Q node, a voltage of a QB node, and a voltage of an output signal in a touch sensing period when a circuit A not including a discharge blocking circuit and a circuit B including a discharge blocking circuit are driven through the same in-cell touch driving method in an environment of 95° C. As can be seen from FIGS. 20 to 22, as the temperature increased, a leakage current of a TFT increased. Further, when there was no discharge blocking circuit, the Q node was excessively discharged. In the environment of 95° C., when there was no discharge blocking circuit, the Q node was completely discharged during the touch sensing period, and a gate pulse Vout was not output. On the other hand, when the discharge blocking circuit was embedded, the voltage of the Q node can be stably held at any temperature during the touch sensing period. Therefore, a gate pulse and a carry signal each having a normal waveform can be generated after the touch sensing period.

As described above, the embodiments connect the discharge blocking circuit to at least some of stages of the shift register outputting the gate pulse. The discharge blocking circuit charges the discharge blocking node connected to the discharge path of the Q node when the Q node is charged, and discharges the Q node when the Q node is discharged, thereby preventing the discharge of the Q node during the touch sensing period. Thus, the embodiments enable a gate driver circuit of a display device, to which the in-cell touch sensor technology is applied, to normally operate and can prevent a reduction in the image quality resulting from the touch sensing period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including:
a plurality of pixels, that are connected to data lines and gate lines, the plurality of pixels divided in a plurality of blocks that are time division driven in a plurality of display periods within one frame period, and
a plurality of touch sensors connected to the pixels;
a touch sensing circuit configured to drive the plurality of touch sensors with a touch sensor driving signal during a touch sensing period between two of the display periods, and sense a touch input during the touch sensing period;
a display driving circuit configured to write data of an input image to the pixels in the plurality of display periods, the display driving circuit comprising a shift register that shifts a gate pulse in accordance with a shift clock and sequentially supplies the gate pulse to the gate lines, the shift register having a plurality of stages, each stage of the shift register including:
a Q node controlling a pull-up transistor increasing a voltage of the gate pulse,
a first transistor charging the Q node in response to a start signal or an output signal of a previous stage, and
a pair of transistors switching on and off a discharge path of the Q node in response to an output signal of a next stage, and
at least one of the stages including:
a discharge blocking circuit coupled to source terminals of the pair of transistors, and configured to charge the source terminal of the pair of transistors when the Q node is charged, and discharge the source terminals of the pair of transistors when the Q node is discharged.

2. The display device of claim 1, wherein each stage further includes a QB node controlling a pull-down transistor decreasing the voltage of the gate pulse.

3. The display device of claim 2, wherein the pair of transistors includes:
a second transistor configured to discharge the Q node in response to the output signal of the next stage; and
a third transistor configured to discharge the Q node in response to a voltage of the QB node.

4. The display device of claim 3, wherein the discharge blocking circuit includes:
a first discharge control switch charging the source terminals of the pair of transistors in response to the start signal or the output signal of the previous stage;
a second discharge control switch discharging the source terminals of the pair of transistors in response to the output signal of the next stage; and
a third discharge control switch discharge the source terminals of the pair of transistors in response to the voltage of the QB node.

5. The display device of claim 3, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage; and
   a diode connected to the source terminals of the pair of transistors.

6. The display device of claim 3, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage; and
   a capacitor connected to the source terminals of the pair of transistors.

7. The display device of claim 3, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage;
   a resistor connected to the source terminals of the pair of transistors; and
   a capacitor connected to the source terminals of the pair of transistors.

8. The display device of claim 1, wherein the discharge blocking circuit includes:
   a first discharge control switch charging the source terminals of the pair of transistors in response to the start signal or the output signal of the previous stage;
   a diode connected to the source terminals of the pair of transistors; and
   a capacitor connected to the source terminals of the pair of transistors.

9. The display device of claim 1, wherein the discharge blocking circuit includes:
   a first discharge control switch charging the source terminals of the pair of transistors in response to the start signal or the output signal of the previous stage;
   a resistor connected to the source terminals of the pair of transistors; and
   a capacitor connected to the source terminals of the pair of transistors.

10. The display device of claim 1, wherein only a first stage corresponding to a first gate line of each block includes the discharge blocking circuit.

11. The display device of claim 1, wherein every stage of the shift register includes the discharge blocking circuit.

12. A gate driver circuit of a display device including a display panel including pixels that are connected to data lines and gate lines and are division-driven based on a plurality of blocks, and a plurality of touch sensors connected to the pixels, the gate driver circuit comprising:
   a shift register configured to shift a gate pulse in accordance with a shift clock and sequentially supply the gate pulse to the gate lines, the shift register having a plurality of stages;
   wherein each stage of the shift register includes:
      a Q node controlling a pull-up transistor increasing a voltage of the gate pulse,
      a first transistor charging the Q node in response to a start signal or an output signal of a previous stage, and
      a pair of transistors switching on and off a discharge path of the Q node in response to an output signal of a next stage; and
   wherein at least one of the stages includes:
      a discharge blocking circuit coupled to source terminals of the pair of transistors, and configured to charge the source terminals of the pair of transistors when the Q node is charged, and discharge the source terminals of the pair of transistors when the Q node is discharged.

13. The gate driver circuit of claim 12, wherein each stage further includes a QB node controlling a pull-down transistor decreasing the voltage of the gate pulse.

14. The gate driver circuit of claim 13, wherein the pair of transistors includes:
   a second transistor configured to discharge the Q node in response to the output signal of the next stage; and
   a third transistor configured to discharge the Q node in response to a voltage of the QB node.

15. The gate driver circuit of claim 14, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage; and
   a third discharge control switch discharge the source terminals of the pair of transistors in response to the voltage of the QB node.

16. The gate driver circuit of claim 14, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage; and
   a diode connected to the source terminals of the pair of transistors.

17. The gate driver circuit of claim 14, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage; and
   a capacitor connected to the source terminals of the pair of transistors.

18. The gate driver circuit of claim 14, wherein the discharge blocking circuit includes:
   a first discharge control switch charging the source terminals of the pair of transistors in response to the start signal or the output signal of the previous stage;
   a second discharge control switch discharging the source terminals of the pair of transistors in response to the output signal of the next stage;
   a resistor connected to the source terminals of the pair of transistors; and
   a capacitor connected to the source terminals of the pair of transistors.

19. The gate driver circuit of claim 12, wherein the discharge blocking circuit includes:
- a first discharge control switch charging the source terminals of the pair of transistors in response to the start signal or the output signal of the previous stage;
- a diode connected to the source terminals of the pair of transistors; and
- a capacitor connected to the source terminals of the pair of transistors.

20. The gate driver circuit of claim 12, wherein the discharge blocking circuit includes:
- a first discharge control switch charging the source terminals of the pair of transistors in response to the start signal or the output signal of the previous stage;
- a resistor connected to the source terminals of the pair of transistors; and
- a capacitor connected to the source terminals of the pair of transistors.

\* \* \* \* \*